(12) United States Patent
Yamada et al.

(10) Patent No.: US 9,548,989 B2
(45) Date of Patent: Jan. 17, 2017

(54) NETWORK MONITORING APPARATUS AND METHOD

(71) Applicant: FUJITSU LIMITED, Kawasaki-shi, Kanagawa (JP)

(72) Inventors: Masahiro Yamada, Kawasaki (JP); Yuki Fujishima, Yokohama (JP); Masanobu Morinaga, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/571,532

(22) Filed: Dec. 16, 2014

(65) Prior Publication Data

US 2015/0195294 A1 Jul. 9, 2015

(30) Foreign Application Priority Data

Jan. 9, 2014 (JP) .................. 2014-002693

(51) Int. Cl.
*H04L 29/00* (2006.01)
*H04L 29/06* (2006.01)

(52) U.S. Cl.
CPC ....... *H04L 63/1416* (2013.01); *H04L 63/1458* (2013.01)

(58) Field of Classification Search
CPC .................. H04L 63/1416; H04L 63/1458
See application file for complete search history.

(56) References Cited

U.S. PATENT DOCUMENTS

| 9,055,096 | B2 * | 6/2015 | Yamada | H04L 63/1416 |
| 2003/0154399 | A1 * | 8/2003 | Zuk | H04L 63/0254 |
| | | | | 726/11 |

(Continued)

FOREIGN PATENT DOCUMENTS

| JP | 2004-537075 | 12/2004 |
| JP | 2006-11683 | 1/2006 |

(Continued)

OTHER PUBLICATIONS

Masahiro Yamada, et al., "A Detection Method against Activities of Targeted Attack on The Internal Network", Computer Security of IPSJ SIG Technical Report, 62$^{nd}$ CSEC and 6$^{th}$ SPT joint research presentation, Jul. 2013, 6 pgs.

*Primary Examiner* — Mohammad A Siddiqi
(74) *Attorney, Agent, or Firm* — Oblon, McClelland, Maier & Neustadt, L.L.P.

(57) ABSTRACT

When obtained communication data corresponds to an external communication from the outside of the network to the inside, external communication data is stored. When the obtained communication data corresponds to a service start, external communication data associated with the service start is extracted, and service start data is stored in correlation with the extracted external communication data. When the obtained communication data corresponds to an operation end, operation end data is stored. When the obtained communication data corresponds to a communication from the inside to the outside of the network, operation end data associated with the obtained communication data is extracted. Then, it is determined that a condition is satisfied that external communication data associated with the obtained communication data is stored in correlation with the service start data associated with the extracted operation end data. When the condition is satisfied, an attack for the system is detected.

8 Claims, 21 Drawing Sheets

(56) References Cited

U.S. PATENT DOCUMENTS

| | | | |
|---|---|---|---|
| 2005/0289231 A1 | 12/2005 | Harada et al. | |
| 2009/0007266 A1* | 1/2009 | Wu | H04L 63/1458 726/22 |
| 2011/0197278 A1* | 8/2011 | Chow | H04L 63/1458 726/24 |
| 2013/0055375 A1* | 2/2013 | Cline | H04L 63/168 726/13 |
| 2013/0340079 A1* | 12/2013 | Gottlieb | H04L 63/1416 726/23 |
| 2014/0075536 A1* | 3/2014 | Davis | H04L 63/1416 726/13 |
| 2015/0127841 A1* | 5/2015 | Kitamura | H04L 67/141 709/228 |

FOREIGN PATENT DOCUMENTS

| | | |
|---|---|---|
| JP | 2007-323428 | 12/2007 |
| JP | 4700884 | 6/2011 |
| WO | WO 01/84285 A2 | 11/2001 |

\* cited by examiner

FIG.6

| EXTERNAL COMMUNICATION | | | | SERVICE START COMMUNICATION | | |
|---|---|---|---|---|---|---|
| SOURCE IP ADDRESS | DESTINATION IP ADDRESS | DESTINATION PORT | SOURCE PORT | COMMUNICATION TIME | SOURCE IP ADDRESS | DESTINATION IP ADDRESS | COMMUNICATION TIME |
| 10.0.1.1 | 192.168.0.2 | 40000 | 443 | 8:50:0.000 | ... | ... | ... |
| ... | ... | ... | ... | ... | | | |

FIG.7

| EXTERNAL COMMUNICATION | | | | | SERVICE START COMMUNICATION | | |
|---|---|---|---|---|---|---|---|
| SOURCE IP ADDRESS | DESTINATION IP ADDRESS | DESTINATION PORT | SOURCE PORT | COMMUNICATION TIME | SOURCE IP ADDRESS | DESTINATION IP ADDRESS | COMMUNICATION TIME |
| 10.0.1.1 | 192.168.0.2 | 40000 | 443 | 8:50:0.000 | 192.168.0.2 | 192.168.0.3 | 8:50:0.200 |
| ... | ... | ... | ... | ... | ... | ... | ... |

| CONNECTION DATA | | | | | |
|---|---|---|---|---|---|
| SOURCE IP ADDRESS | DESTINATION IP ADDRESS | DESTINATION PORT | SOURCE PORT | START TIME | UPDATE TIME |
| 10.0.1.1 | 192.168.0.2 | 40000 | 443 | 7:30:0.000 | 8:50:0.000 |
| ⋮ | ⋮ | ⋮ | ⋮ | ⋮ | ⋮ |
| | | | | | |

FIG.20

| | OPERATION END | | | OUTBOUND COMMUNICATION | | |
|---|---|---|---|---|---|---|
| SOURCE IP ADDRESS | DESTINATION IP ADDRESS | COMMUNICATION TIME | FIXING FLAG | SOURCE IP ADDRESS | DESTINATION IP ADDRESS | COMMUNICATION TIME |
| 192.168.6.6 | 192.168.7.7 | 9:00:0.000 | CANDIDATE | | | |
| ... | ... | ... | ... | ... | ... | ... |

FIG.22

| | OPERATION END | | | OUTBOUND COMMUNICATION | | |
|---|---|---|---|---|---|---|
| SOURCE IP ADDRESS | DESTINATION IP ADDRESS | COMMUNICATION TIME | FIXING FLAG | SOURCE IP ADDRESS | DESTINATION IP ADDRESS | COMMUNICATION TIME |
| 192.168.0.2 | 192.168.0.2 | 8:51:0.000 | FIXED | | | |
| 192.168.6.6 | 192.168.7.7 | 9:00:0.000 | CANDIDATE | 192.168.6.6 | 10.0.8.8 | 9:00:0.900 |
| ... | ... | ... | ... | ... | ... | ... |

NETWORK MONITORING APPARATUS AND METHOD

CROSS-REFERENCE TO RELATED APPLICATIONS

This application is based upon and claims the benefit of priority of the prior Japanese Patent Application No. 2014-002693, filed on Jan. 9, 2014, the entire contents of which are incorporated herein by reference.

FIELD

This invention relates to a technique for security measures for systems connected to a network.

BACKGROUND

Recently, attacks that use proprietary or customized malware are frequently performed. Especially, damage examples of targeted attacks for a specific company increase. In a lot of examples, a following attack method is utilized. Namely, a user terminal in the company is infected with a remote-control-type malware, the infected user terminal is used as a springboard to intrude into other apparatuses such as user terminals in the company, and other apparatuses are infected with the remote-control-type malware.

As a conventional network monitoring technique, there is a signature method in which a pattern of communication data in the remote control is defined for each malware, and communication data that flows in the network is compared with the pattern to detect the malware. However, it is possible for the signature method to detect only the malware for which the pattern of the communication data has been created, and it is impossible to detect proprietary or customized malware.

Moreover, as illustrated in FIG. 1, there is a technique for detecting an attack in which a certain user terminal is used as a springboard by the remote control, and a new malware for the remote control is sent to other user terminals and other user terminals are infected. See Masahiro Yamada, Masanobu Morinaga, Yuki Unno, Satoru Torii and Masahiko Takenaka, "A Detection Method against Activities of Targeted Attack on The Internal Network", Computer Security of IPSJ SIG Technical Report, 62nd CSEC and 6th SPT joint research presentation, July 2013, for example. In this technique, following communications that are determined as being normal when individual communications are observed are determined as an attack. In other words, a command is sent from an attacker's terminal outside a system by using Hyper Text Transfer Protocol (HTTP) or HTTP Secure (HTTPS) to a user terminal A in the system, and a remote control malware is sent from the user terminal A to a user terminal B by using normal Server Message Block (SMB) or the like and executed, and a new connection is established from the user terminal B to the attacker's terminal. A procedure to establish the connection is 3-way handshake, for example.

However, in an intelligence activity in which the remote control malware is not executed on the user terminal B, however, information is acquired by executing a command and/or program from the user terminal B, and the information is obtained on the attacker's terminal through the user terminal A, no egress connection from the user terminal B to the attacker's terminal occurs. Therefore, such an intelligence activity cannot be detected.

Non-Patent Document 1: Masahiro Yamada, Masanobu Morinaga, Yuki Unno, Satoru Torii and Masahiko Takenaka, "A Detection Method against Activities of Targeted Attack on The Internal Network", Computer Security of IPSJ SIG Technical Report, 62nd CSEC and 6th SPT joint research presentation, July 2013.

Patent Document 1: Japanese National Publication of International Patent Application No. 2004-537075

Patent Document 2: Japanese Laid-open Patent Publication No. 2007-323428

Patent Document 3: Japanese Patent No. 4700884

SUMMARY

A network monitoring method relating to this invention includes: (A) obtaining communication data; (B) upon detecting that the obtained communication data satisfies a first condition including a condition that a communication relating to the obtain communication data is a communication from an outside of a predefined range in a network, storing external communication data including an address of a transmission source and an address of a transmission destination of the obtained communication data in a data storage unit; (C) upon detecting that the obtained communication data satisfies a second condition including a condition that the obtained communication data corresponds to a communication within the predefined range or a communication from an inside of the predefined range to the outside of the predefined range and corresponds to a predetermined service start, first extracting external communication data that includes, as an address of a transmission destination, the address of the transmission source of the obtained communication data from the data storage unit, and storing service start data that includes the address of the transmission destination of the obtained communication data in the data storage unit in correlation with the extracted external communication data; (D) upon detecting that the obtained communication data satisfies a third condition including a condition that the obtained communication data corresponds to a communication within the predefined range or a communication from the outside of the predefined range to the inside of the predefined range and corresponds to a predetermined operation end, storing operation end data that includes the address of the transmission source and the address of the transmission destination of the obtained communication data in the data storage unit; (E) upon detecting that the obtained communication data corresponds to a communication to the outside of the predefined range, second extracting certain operation end data that includes the address of the transmission source of the obtained communication data from the data storage unit; and (F) determining whether a fourth condition is satisfied, wherein the fourth condition comprises a condition that certain external communication data that includes the address of the transmission destination and the address of the transmission source, which are included in the obtained communication data, as the address of the transmission source and the address of the transmission destination, is stored in the data storage unit in correlation with certain service start data that includes the address of the transmission source or the address of the transmission destination of the certain operation end data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a diagram depicting a first state example of data stored in an associated data storage unit relating to the first embodiment;
FIG. 7 is a diagram depicting a second state example of data stored in the associated data storage unit relating to the first embodiment;
FIG. 20 is a diagram depicting a first state example of data stored in a session data storage unit relating to the third embodiment;
FIG. 22 is a diagram depicting a second state example of data stored in the session data storage unit relating to the third embodiment.

DESCRIPTION OF EMBODIMENTS

Embodiment 1

Figure 1:
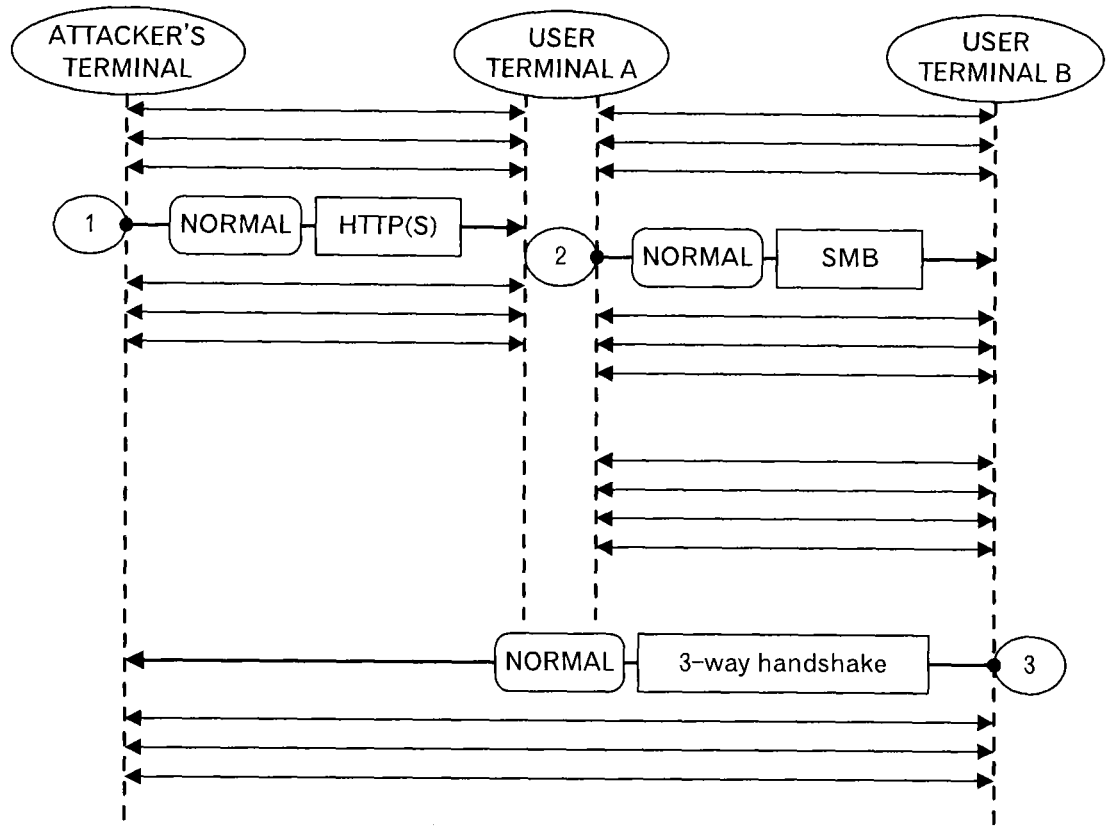
FIG. 1 is a diagram to explain a conventional technique.
Figure 2:
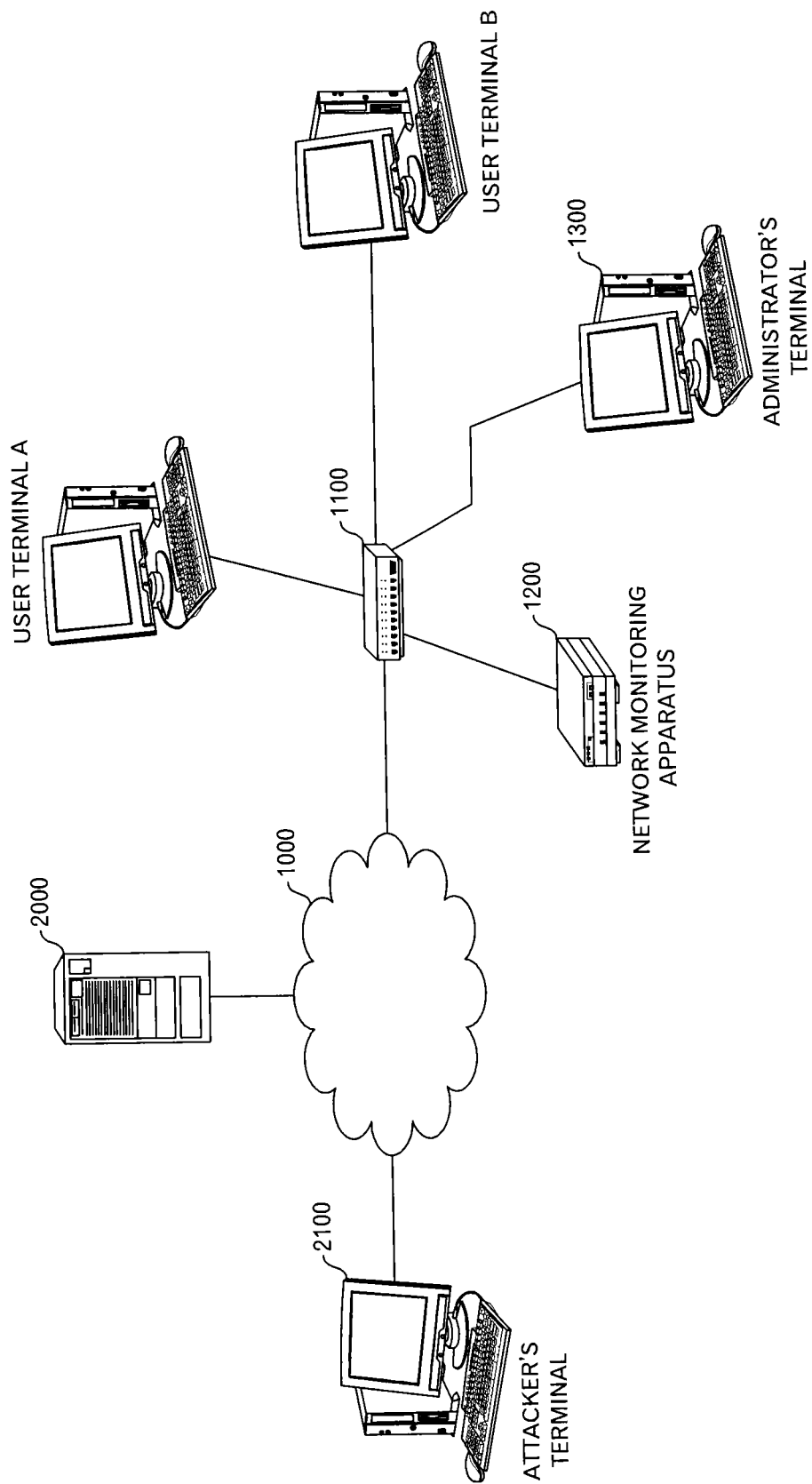
FIG. 2 is a diagram depicting an example of a system.

An outline of a system relating to this embodiment will be explained by using FIG. 2. As illustrated in FIG. 2, various servers 2000, an attacker's terminal 2100 operated by an attacker and a communication apparatus 1100 such as a router in a company are connected to the Internet 1000. A network monitoring apparatus 1200, plural user terminals including a user terminal A, a user terminal B and an administrator's terminal 1300 and servers are connected to the communication apparatus 1100. The communication apparatus 1100 outputs communication data (specifically, packets) that flows through the communication apparatus 1100, to the network monitoring apparatus 1200 by mirroring.

Figure 3:
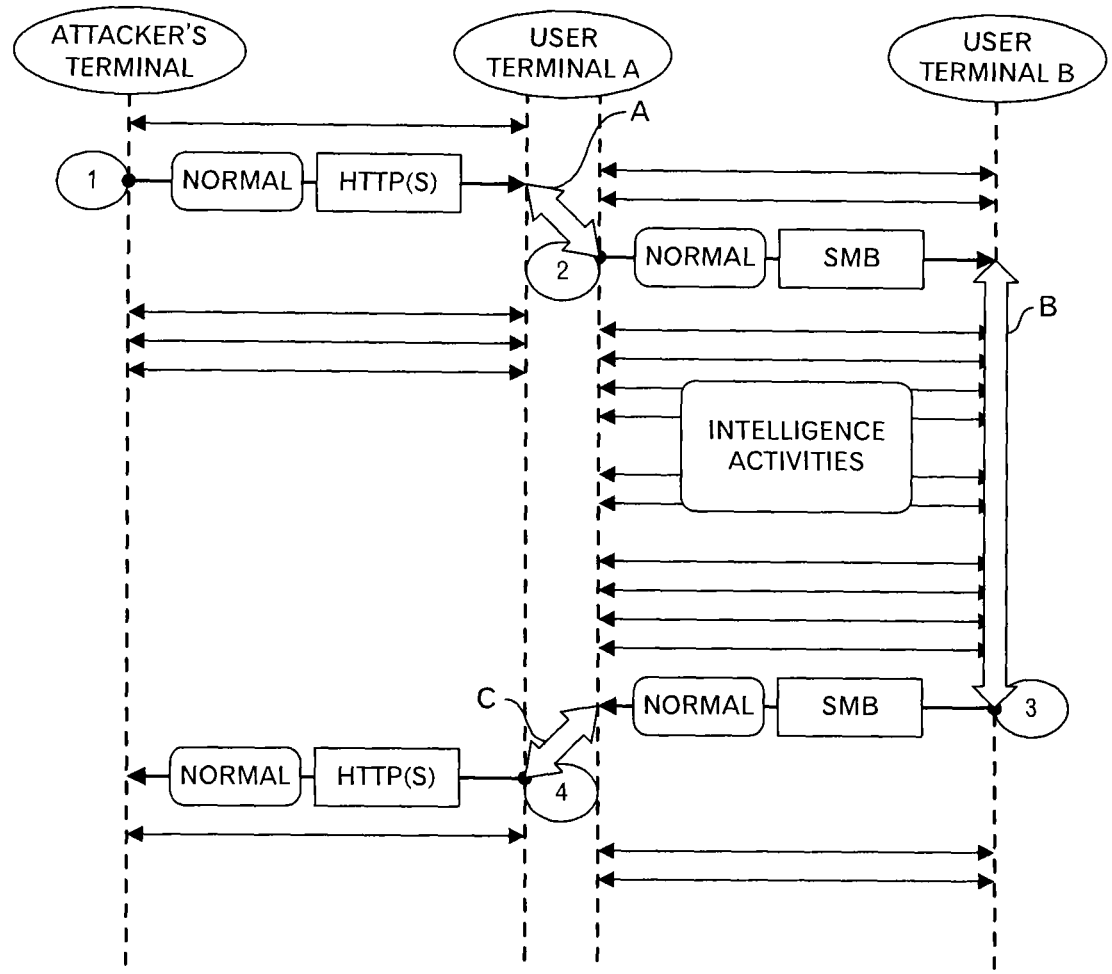
FIG. 3 is a diagram schematically illustrating a viewpoint to detect an attack relating to a first embodiment.

In this embodiment, when the intelligence activities are performed for the user terminal B that is a target by remotely controlling the user terminal A as the springboard, communications among the attacker's terminal 2100, user terminal A and attacked user terminal B occur as illustrated in FIG. 3.

Firstly, a communication on data concerning a command for the user terminal A from the attacker's terminal 2100 occurs (i.e. a first external communication or inbound communication (1)). This is a communication in HTTP or HTTPS, for example. Next, a communication, for example, by SMB (i.e. service start (2)) from the user terminal A to the user terminal B is performed to start the service on the user terminal B. Thus, the service start (2) is performed synchronizing with the first external communication (1) (A in FIG. 3). After this, various communications between the user terminal A and the user terminal B are performed for a long time (e.g. 30 seconds) (B in FIG. 3). Then, when the intelligence activities end by such communications, a communication (operation end (3)) that represents an operation end is performed, for example by SMB from the user terminal B to the user terminal A, and finally, a second external communication (outbound communication (4)) from the user terminal A to the attacker's terminal 2100 occurs. Thus, the second external communication (4) is performed synchronizing with the operation end (3) (C in FIG. 3). The first external communication, service start, operation end and second external communication are normal communications when they are independently checked, therefore, it is impossible for a conventional method to determine that those are attacks.

Then, in this embodiment, improper intelligence activities are detected by tracing back the communications such as tracking back the communications from the second external communication to the operation end, the communications from the operation end to the service start and the communication from the service start to the first external communication. When messages included in one transaction in a 3-layer client-server system that includes a Web server, application server and DB server are analyzed, communications from receiving, by the Web server in the first layer, a request in HTTP or the like from an external user terminal to replying with a response against the request to the external user terminal are analyzed. However, the intelligence activities assumed in this embodiment cannot be detected by the aforementioned analysis, because there is no simple relationship between the first external communication (1) and the second external communication (4), in other words, that relationship does not correspond to a relationship between the request and the response in HTTP.

Figure 4:
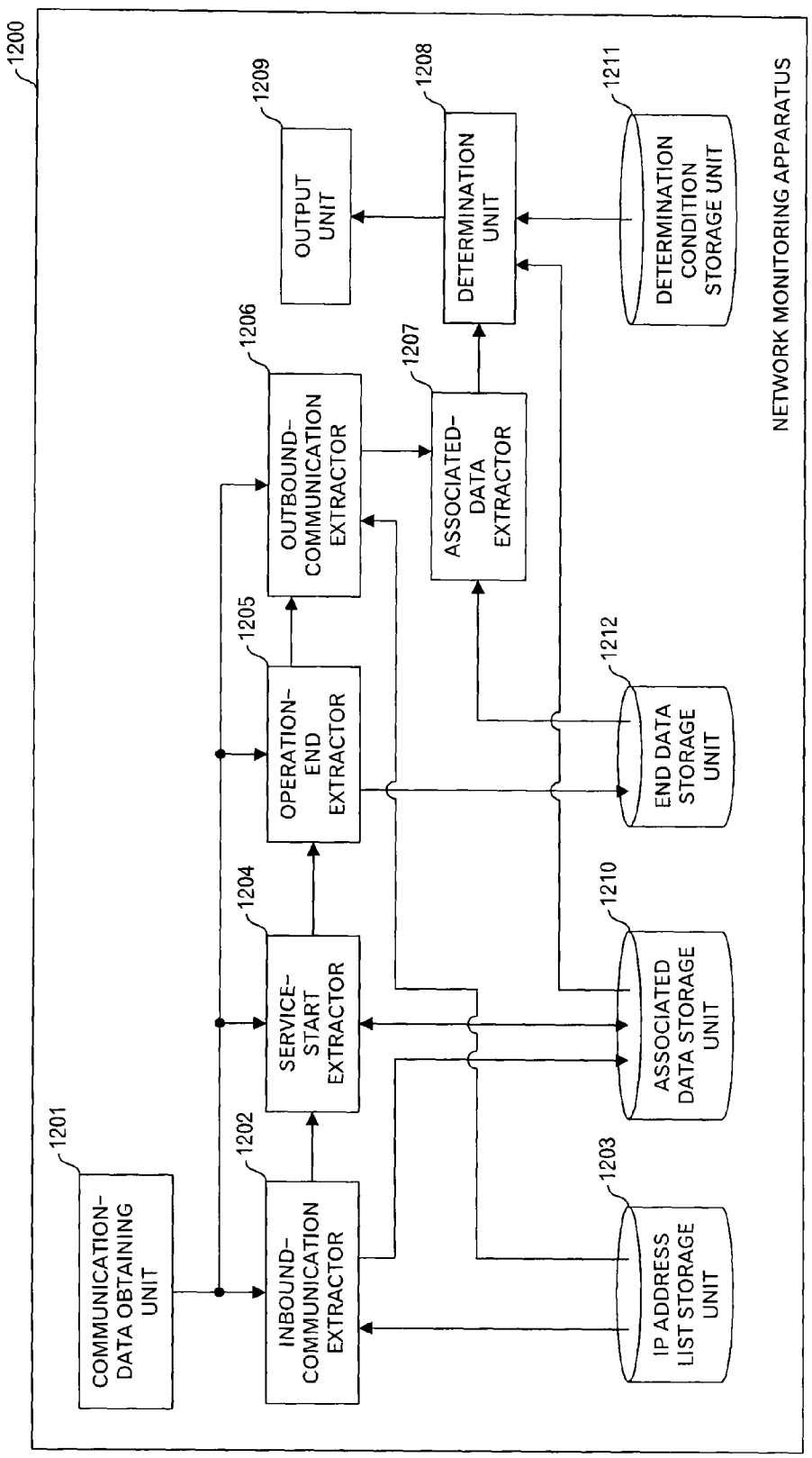
FIG. 4 is a diagram a configuration example of a network monitoring apparatus relating to the first embodiment.

Therefore, the network monitoring apparatus 1200 in this embodiment has a configuration as illustrated in FIG. 4. Namely, the network monitoring apparatus 1200 has a communication-data obtaining unit 1201, an inbound-communication extractor 1202, a service-start extractor 1204, an operation-end extractor 1205, an outbound-communication extractor 1206, an associated-data extractor 1207, an IP address list storage unit 1203, an associated data storage unit 1210, a determination condition storage unit 1211, an end data storage unit 1212, a determination unit 1208 and an output unit 1209.

The communication-data obtaining unit 1201 receives communication data from the communication apparatus 1100. The IP address list storage unit 1203 stores a list of IP addresses that belong to the inside of the system. The inbound-communication extractor 1202 determines, based on the list of IP addresses, which is stored in the IP address list storage unit 1203, whether or not the communication data from the communication-data obtaining unit 1201 corresponds to the first external communication (i.e. inbound communication), and when the communication corresponds to the first external communication, the inbound-communication extractor 1202 stores the external communication data in the associated data storage unit 1210.

The service-start extractor 1204 determines whether or not the communication data from the communication-data obtaining unit 1201 corresponds to the service start, further extracts associated external communication data in the associated data storage unit 1210, and stores service start data in correlation with the extracted external communication data in the associated data storage unit 1210.

The operation-end extractor 1205 determines whether or not the communication data from the communication-data obtaining unit 1201 corresponds to the operation end, and when the communication data corresponds to the operation end, the operation-end extractor 1205 stores the operation end data in the end data storage unit 1212.

The outbound-communication extractor 1206 determines whether or not the communication data from the communication-data obtaining unit 1201 corresponds to the outbound communication, and when the communication data corresponds to the outbound communication, the outbound communication extractor 1206 outputs the communication data to the associated-data extractor 1207.

The associated-data extractor 1207 extracts the operation end data associated with the outbound communication from the end data storage unit 1212, and outputs the outbound communication data and the operation end data to the determination unit 1208.

The determination unit 1208 extracts the service start data and the external communication data, which are associated with the outbound communication data and the operation end data, from the associated data storage unit 1210, and determines whether or not the obtained data satisfies a determination condition stored in the determination condition storage unit 1211. When the obtained data satisfies the determination condition, the determination unit 1208 causes the output unit 1209 to transmit detection notification of the intelligence activities (i.e. attack) to the administrator's terminal 1300. The determination condition storage unit 1211 stores data representing a condition for communication intervals, for example.

Next, processing contents of the network monitoring apparatus 1200 will be explained by using FIGS. 5 to 10.

When the communication-data obtaining unit 1201 obtains communication data from the communication apparatus 1100 (FIG. 5: step S1), the communication-data obtaining unit 1201 outputs the communication data to the inbound-communication extractor 1202, the service-start extractor 1204, the operation-end extractor 1205 and the outbound-communication extractor 1206. In the second embodiment and subsequent embodiments, the communication data may be outputted to other extractors.

On the other hand, when the inbound-communication extractor 1202 receives the communication data, the inbound-communication extractor 1202 determines whether or not the communication relating to the communication data corresponds to a predetermined inbound communication (step S3). More specifically, it is determines whether or not a condition is satisfied that the communication data represents the communication in HTTP or HTTPS protocol and the IP address of the transmission source (SrcIP address) of the communication data is not included in the list of IP addresses, which is stored in the IP address list storage unit 1203, namely, the IP address of the transmission source is an IP address of an apparatus outside the system. When this condition is not satisfied, the inbound-communication extractor 1202 instructs the service-start extractor 1204 to perform a processing. The communication data includes data of packets and a time (called "a communication time") when the communication apparatus 1100 or network monitoring apparatus 1200 received the packet.

On the other hand, when the IP address of the transmission source in the communication data is the IP address of the apparatus outside the system and the communication relating to the communication data is the communication in HTTP or HTTPS, this communication is the external communication (i.e. inbound communication) to be focused on, the inbound-communication extractor 1202 stores the IP address (SrcIP address) of the transmission source, an IP address (DstIP address) of the transmission destination, a port number of the transmission destination, and a port number of the transmission source of the communication data and the communication time in the associated data storage unit 1210 (step S5). When the external communication to be focused on is detected, the inbound-communication extractor 1202 causes subsequent extractors such as the service-start extractor 1204 and the operation-end extractor 1205 to discard the communication data that was received this time.

For example, data as illustrated in FIG. 6 is stored in the associated data storage unit 1210. In an example of FIG. 6, external communication data including the IP address of the transmission source, the IP address of the transmission destination, the port number of the transmission destination, the port number of the transmission source and the communication time is stored in correlation with the service start data including the IP address of the transmission source, the IP address of the transmission destination and the communication time. In this example, it is assumed that the IP address of the attacker's terminal 2100 is "10.0.1.1", and the IP address of the user terminal A is "192.168.0.2", and the port number of the transmission destination is "40000", and the port number of the transmission source is "443", and the communication time is "8:50:0.000". At this stage, the service start data is not registered in association with the external communication data.

After that, for example, the communication-data obtaining unit 1201 determines whether or not the processing end is instructed (step S13), and when the processing end is not instructed, the processing returns to the step S1. On the other hand, when the processing end is instructed, the processing ends.

On the other hand, when the service-start extractor 1204 is instructed from the inbound-communication extractor 1202 to perform the processing (step S3: No route), the service-start extractor 1204 determines whether or not the received communication data is communication data relating to a predetermined service start (step S7).

For example, when the communication to be processed is communication in Distributed Computing Environment/Remote Procedure Calls (DCE/RPC) over SMB or DCE/RPC protocol and an option in DCERPC header is "StartServiceW", it is determined that the communication is the communication relating to the predetermined service start.

When the condition of the step S7 is not satisfied, the operation-end extractor 1205 is instructed to perform a processing. The processing shifts to a processing in FIG. 8 through terminal A.

When the communication relating to the communication data is the communication relating to the predetermined service start, the service-start extractor 1204 determines whether or not the external communication data associated with this communication data is stored in the associated data storage unit 1210 (step S9). When the service start is detected, the service-start extractor 1204 causes the operation-end extractor 1205, the outbound-communication extractor 1206 and the subsequent extractors to discard the communication data that was received this time.

The external communication data whose destination is the IP address (SrcIP address) of the transmission source of this communication data is identified by reversely tracing the external communication data from the communication time of this communication data.

When the external communication data whose destination is the IP address (SrcIP address) of the transmission source of this communication data cannot be extracted in the associated data storage unit 1210, the processing shifts to step S13.

On the other hand, when the external communication data whose destination is the IP address (SrcIP address) of the transmission source of this communication data is extracted, the associated external communication data is extracted. Therefore, the service-start extractor 1204 stores the service start data including at least the IP address (DstIP address) of the transmission destination of the received communication data and the communication time in the associated data storage unit 1210 in correlation with the extracted external communication data (step S11). After that, the processing shifts to the step S13.

In an example of FIG. 6, when a line including specific numerical values represents the associated external communication data, the service start data including the IP address of the transmission source, the IP address of the transmission destination and the communication time is stored as illustrated in FIG. 7. Specifically, in an example of FIG. 7, because the IP address of the transmission source of the received communication data is "192.168.0.2" and the IP address of the transmission destination of the received communication data is "192.168.0.3", the IP address "192.168.0.3" of the transmission destination of the received communication data, the IP address "192.168.0.2" of the transmission source of the received communication data and the communication time "8:50:0.200" are stored as the service start data. The IP address of the transmission source may be omitted.

Figure 8:
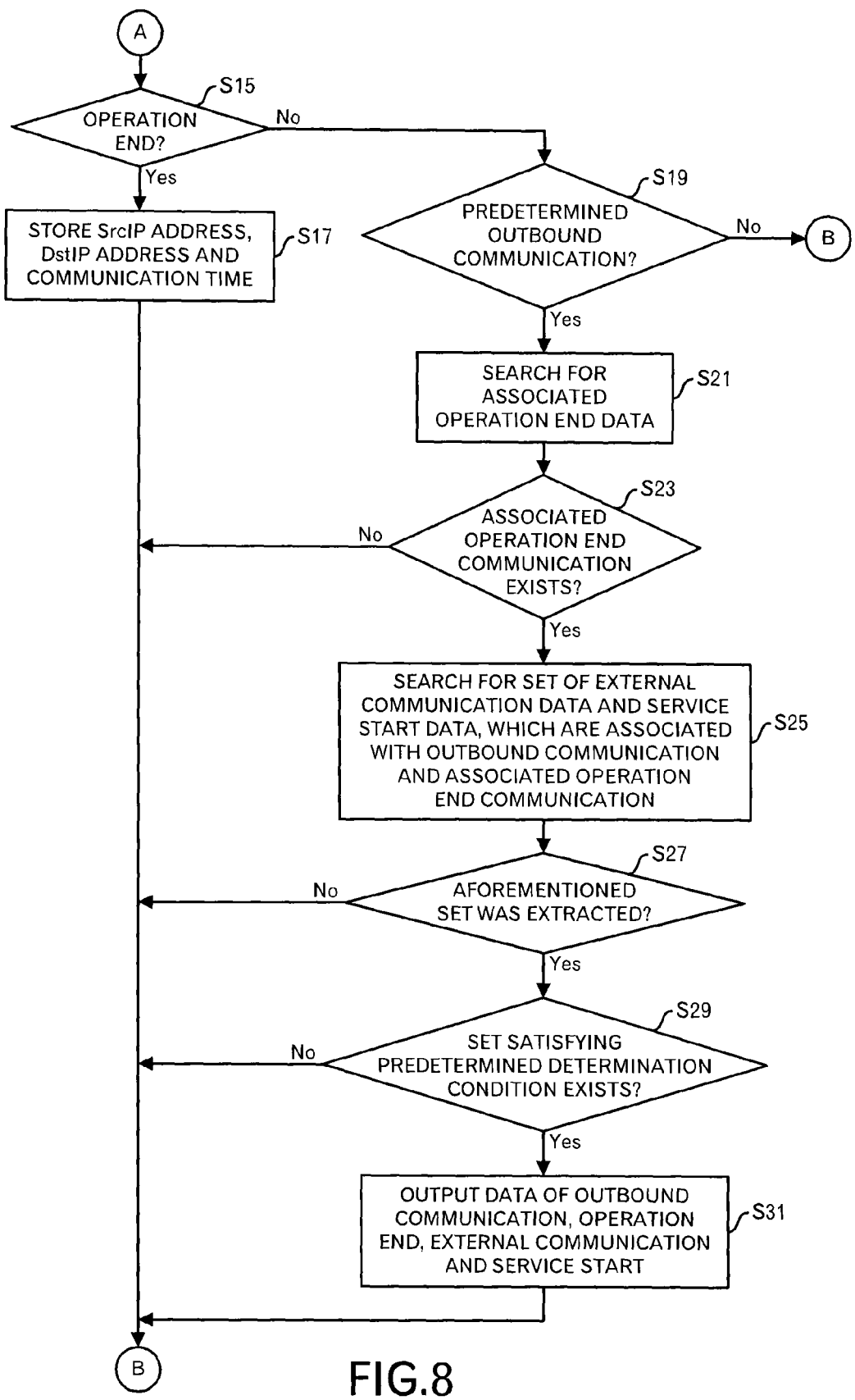
FIG. 8 is a diagram depicting a processing flow relating to the first embodiment.

Next, a processing after the terminal A will be explained by using FIG. 8. In response to an instruction from the service-start extractor 1204, the operation-end extractor 1205 determines whether or not the communication data from the communication-data obtaining unit 1201 corresponds to a predetermined operation end (step S15). For example, it is determined whether or not an option in the DCERPC header is "Delete Service Request" in the communication of DCE/RPC over SMB or DCR/RPC protocol.

When such a condition is satisfied, the operation-end extractor 1205 stores the operation end data including the IP address (SrcIP address) of the transmission source, the IP address (DstIP address) of the transmission destination and the communication time, which are included in the communication data, in the end data storage unit 1212 (step S17).

Figures 9, 10:
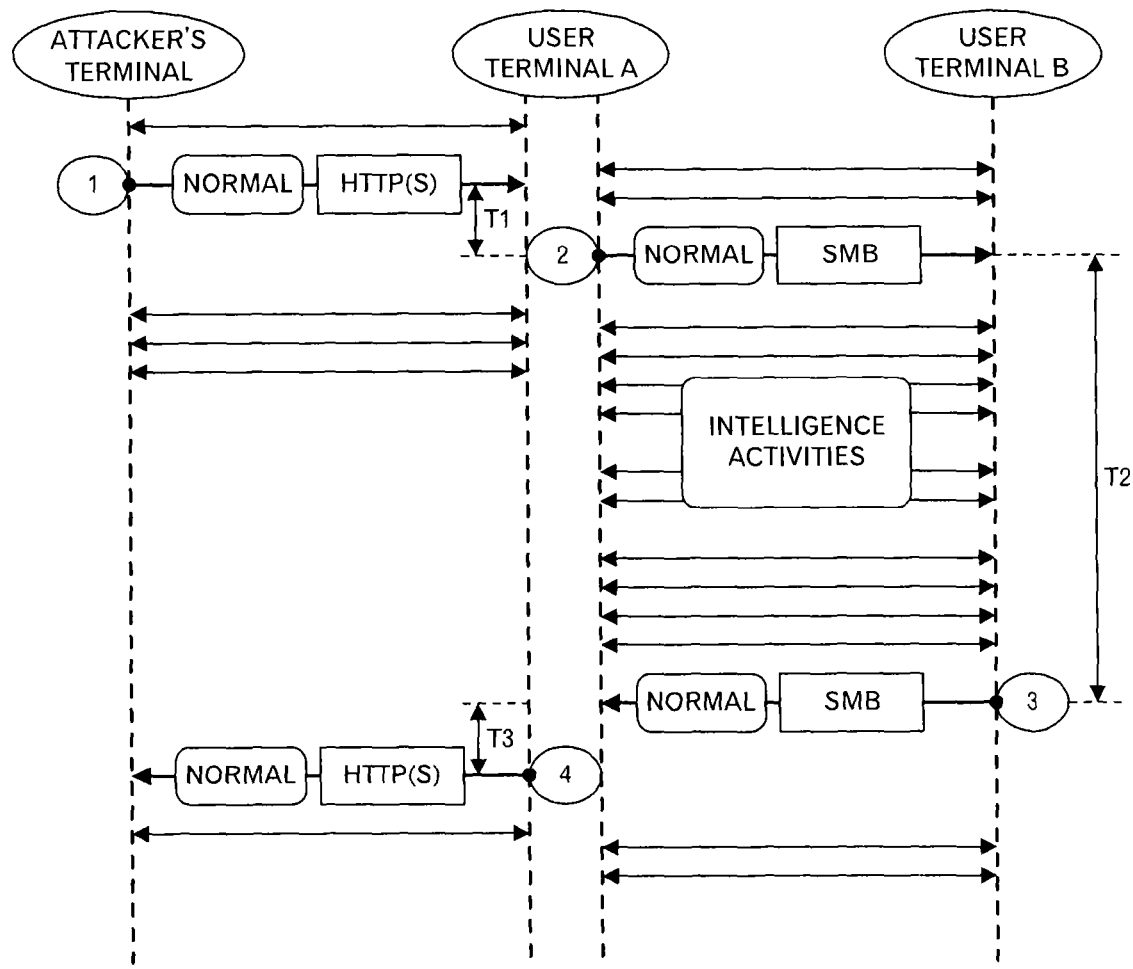
FIG. 9 is a diagram depicting an example of data stored in an end data storage unit relating to the first embodiment.
FIG. 10 is a diagram to explain a determination condition.

For example, data as illustrated in FIG. 9 is stored in the end data storage unit 1212. In an example of FIG. 9, the IP address of the transmission source, the IP address of the transmission destination and the communication time are registered.

Figure 5:
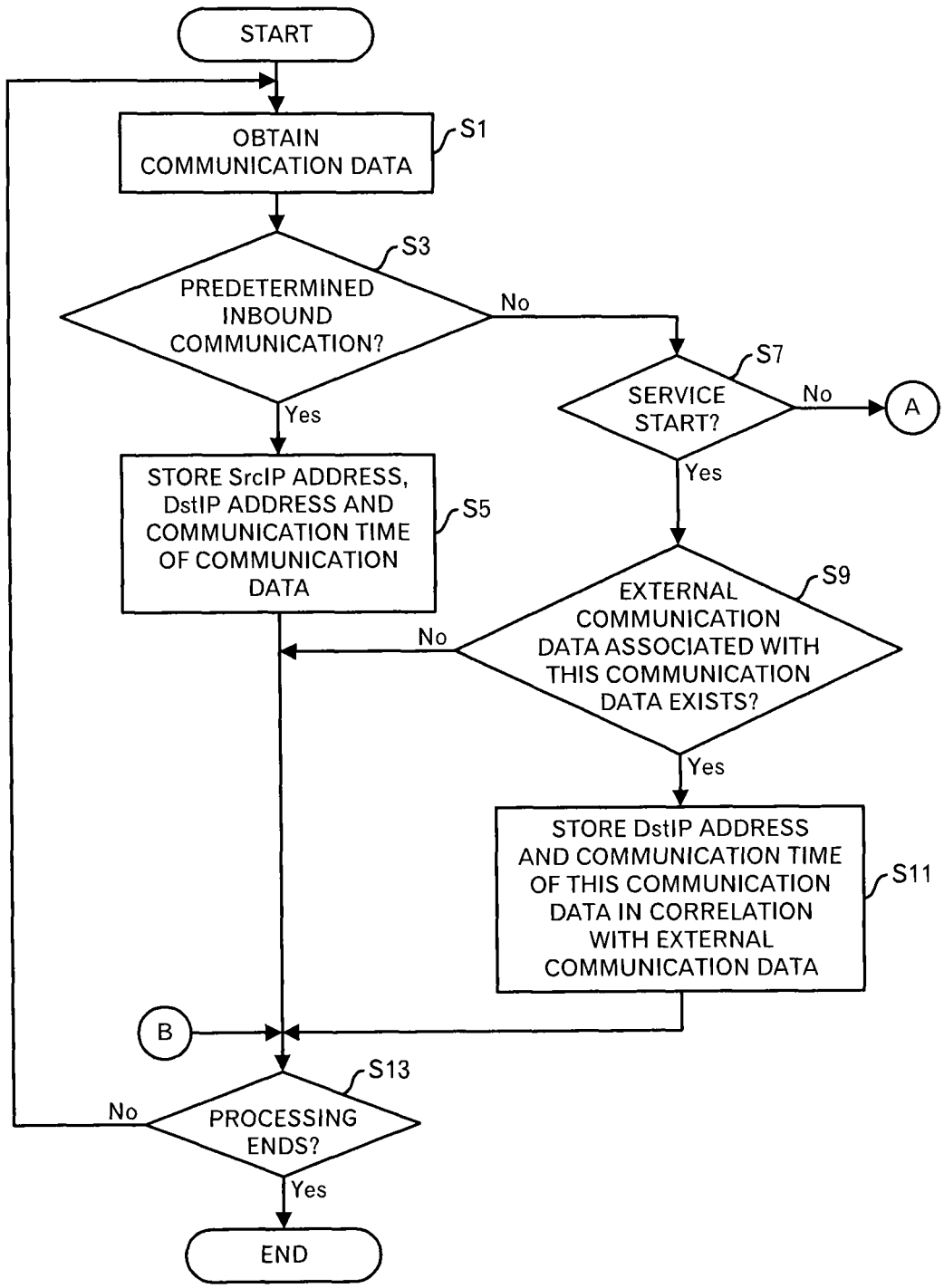
FIG. 5 is a diagram depicting a processing flow relating to the first embodiment.

After that, the processing shifts to the step S13 in FIG. 5 through terminal B. Moreover, the operation-end extractor 1205 causes the outbound-communication extractor 1206 to discard the communication data that was received this time.

On the other hand, when the communication data that was received this time does not correspond to the predetermined operation end, the operation-end extractor 1205 instructs the outbound-communication extractor 1206 to perform a processing. In response to the instruction from the operation-end extractor 1205, the outbound-communication extractor 1206 determines whether or not the communication data from the communication-data obtaining unit 1201 corresponds to a predetermined outbound communication (step S19).

Specifically, it is determined whether or not a condition is satisfied that the communication is the communication in HTTP or HTTPS, and the IP address (DstIP address) of the transmission destination of the communication data is not included in the list of IP addresses, which is stored in the IP address list storage unit 1203, in other words, the IP address (DstIP address) of the communication data is an IP address of any apparatus outside the system.

When the communication data that was received this time is not the predetermined outbound communication, the processing returns to the step S13 in FIG. 5 through the terminal B.

On the other hand, when the communication data corresponds to the predetermined outbound communication, the outbound-communication extractor 1206 outputs the communication data that was received this time to the associated-data extractor 1207.

The associated-data extractor 1207 searches the end data storage unit 1212 for the operation end data associated with this outbound communication, and extracts the pertinent operation end data, when this operation end data exists in the end data storage unit 1212 (step S21). Specifically, the operation end data, which includes, as the IP address of the transmission source or transmission destination, the same IP address as the IP address of the transmission source in this outbound communication, is extracted. In this search, the operation end data for plural times of the communications may be extracted.

When no operation end data associated with this outbound communication is stored in the end data storage unit 1212, (step S23: No route) the processing returns to the step S13 in FIG. 5 through the terminal B.

On the other hand, when the operation end data associated with this outbound communication is stored in the end data storage unit 1212 (step S23: Yes route), the associated-data extractor 1207 outputs the communication data that was received this time (i.e. the communication data in the outbound communication) and the associated operation end data to the determination unit 1208.

The determination unit 1208 searches the associated data storage unit 1210 for a set of the external communication data and the service start data, which are associated with the communication data that was received this time (i.e. the communication data in the outbound communication) and the associated operation end data, and extracts data of that set, when that set exists (step S25).

Specifically, it is determined whether or not a condition is satisfied that there is service start data including the IP address of the transmission destination and the IP address of the transmission source, which are included in the operation end data, as the IP address of the transmission destination and the IP address of the transmission source or the IP address of the transmission source and the IP address of the transmission destination. Furthermore, it is also determined whether or not a condition is satisfied that the IP address of the transmission source and the IP address of the transmission destination, which are included in the external communication data that is correlated with that service start data, are included in the communication data that was received this time as the IP address of the transmission destination and the IP address of the transmission source.

Then, when the set of the external communication data and the service start data, which are associated with the communication data that was received this time (i.e. the communication data in the outbound communication) and the associated operation end data, is not detected in the associated data storage unit 1210 (step S27: No route), the processing returns to the step S13 in FIG. 5 through the terminal B.

On the other hand, when the set of the external communication data and the service start data, which are associated with the communication data that was received this time (i.e. the communication data in the outbound communication) and the associated operation end data, is extracted (step S27: Yes route), the determination unit 1208 determines whether or not the aforementioned set that satisfies a determination condition stored in the determination condition storage unit 1211 exists (step S29).

The determination condition is that a difference (T1 in FIG. 10) between the communication time of the service start data and the communication time of the external communication data is within 1000 msec, for example, and a difference (T2 in FIG. 10) between the communication time of the external communication data and the communication time of the operation end data is within 10000 msec, for example, and a difference (T3 in FIG. 10) between the communication time of the operation end data and the communication time of the outbound communication (i.e. the communication time of the communication data that was received this time) is within 1000 msec, for example. Typically, the period of the intelligence activities becomes long because various processing is performed.

When data that satisfies the determination condition is extracted, the determination unit 1208 notifies detection of the intelligence activities by causing the output unit 1209 to transmit the data of the outbound communication (i.e. communication relating to the communication data that was received this time), operation end, external communication and the service start to the administrator's terminal 1300, for example (step S31). Then, the processing returns to the step S13 in FIG. 5 through the terminal B. When the data that satisfies the determination condition is not extracted, the processing returns to the step S13 in FIG. 5 through the terminal B.

By performing the aforementioned processing, it becomes possible to detect an attack from the external apparatus based on the sequential communications, even when individual communications are normal.

Embodiment 2

In communications for the normal jobs, it is assumed that a lot of candidates of the outbound communication exist, and there is possibility that wrong combination of the outbound communication and the operation end may be made. On the other hand, the remote-control-type malware has a feature that the realtime remote control is realized by maintaining the connection. Therefore, when the outbound communication is extracted, the outbound communication is limited to a connection-type communication whose duration of the connection is long (e.g. equal to or longer than 30 minutes). Accordingly, by limiting the candidates of the outbound communications and preventing from tracing back the communications from wrong outbound communications, it is possible to lower the possibility that wrong data is detected.

Figure 11:
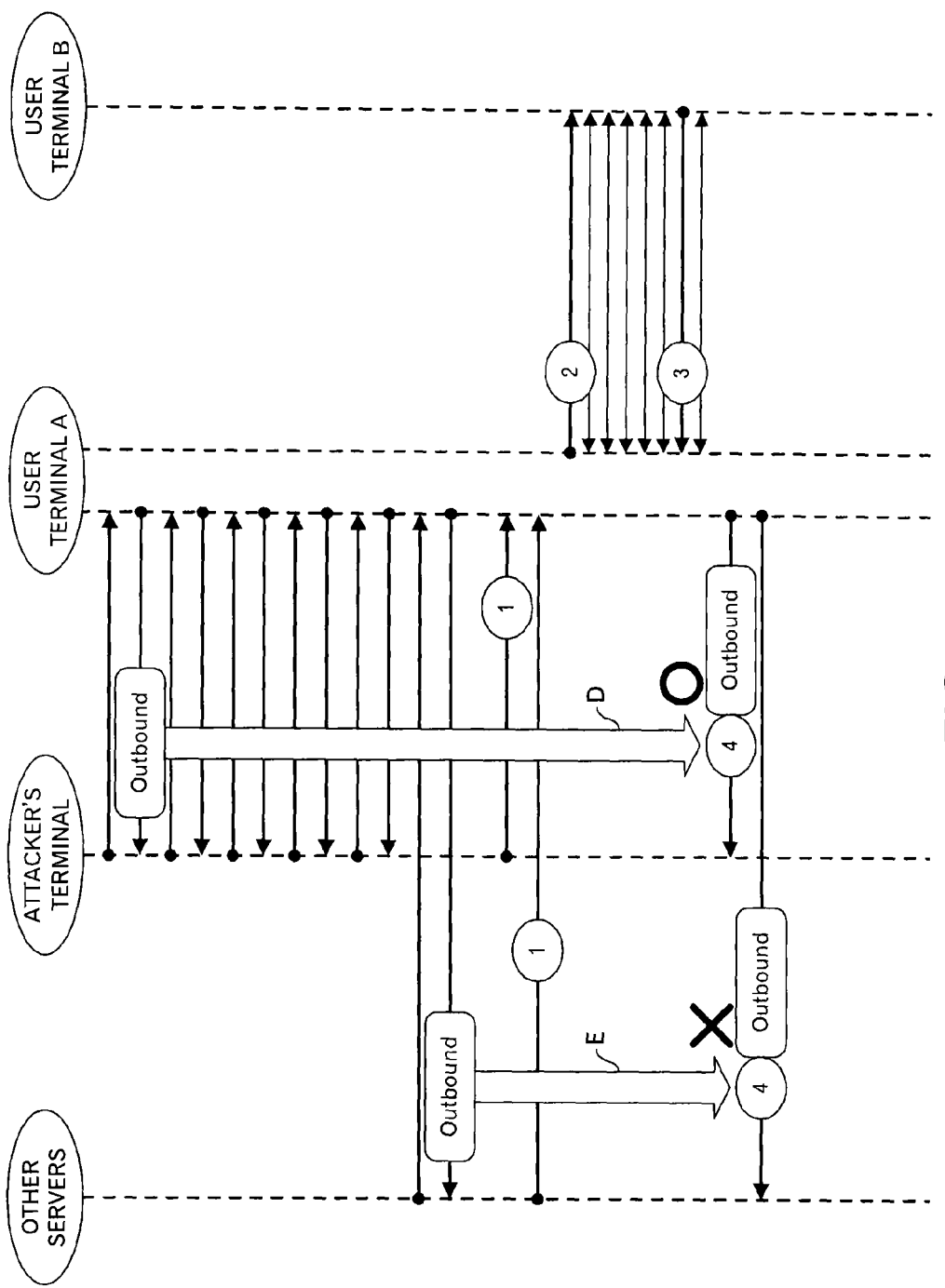
FIG. 11 is a diagram schematically illustrating a viewpoint to detect an attack relating to a second embodiment.

In an example of FIG. 11, when the malware is entered from the attacker's terminal 2100 to the user terminal A, a lot of communications between them are performed. However, the second outbound communication (4) whose duration D is equal to or longer than 30 minutes, for example, since the first outbound communication from the user terminal A to the attacker's terminal 2100, is extracted as the outbound communication that represents the final stage of the intelligence activities. On the other hand, similar communications between other servers and the user terminal A are performed. However, when the duration E between the first outbound communication and the outbound communication to be focused on is less than 30 minutes, the operation end data is not extracted by using the outbound communication to be focused on. This can heighten the extraction accuracy of the intelligence activities.

Figure 12:
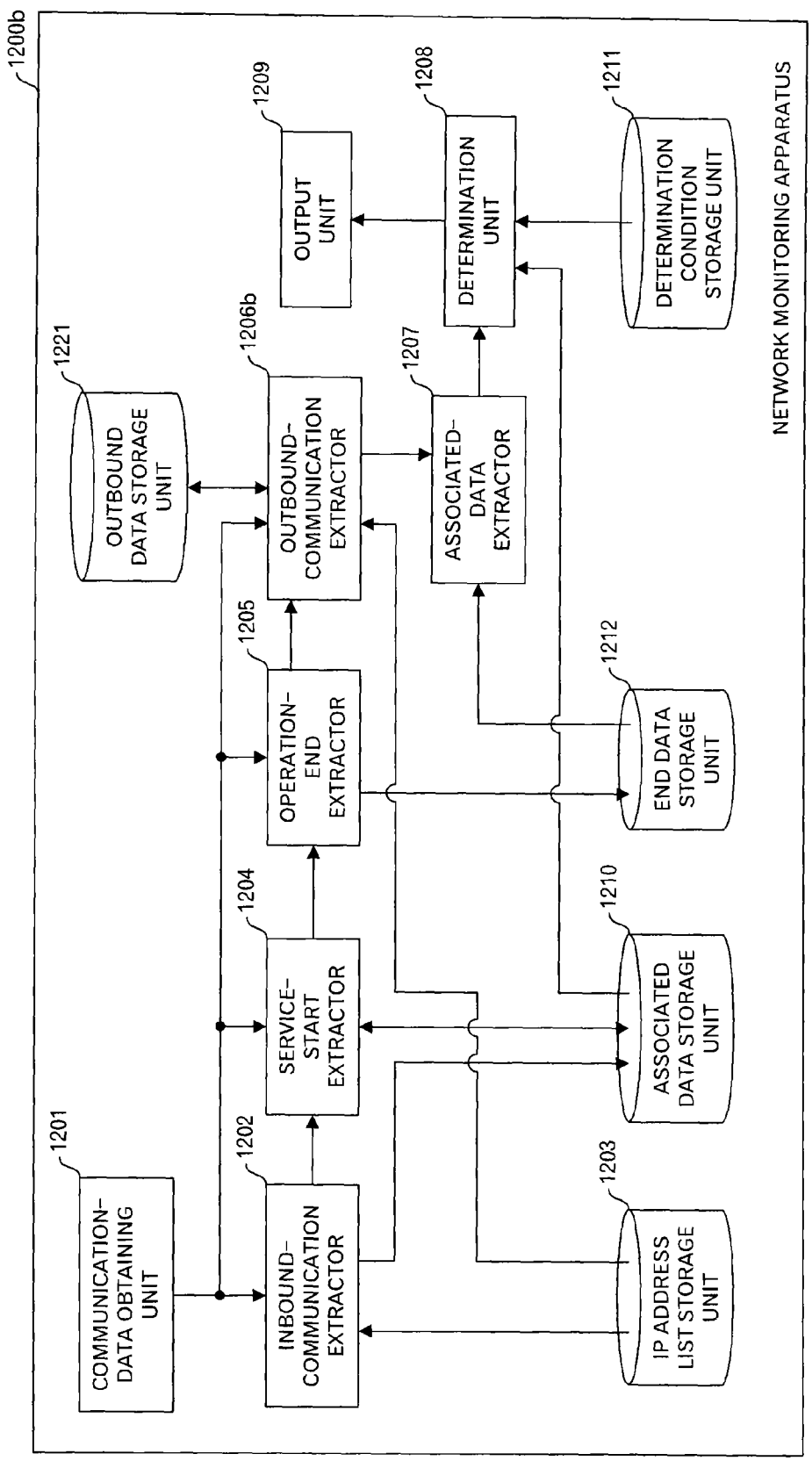
FIG. 12 is a diagram depicting a configuration example of a network monitoring apparatus relating to the second embodiment.

Next, a functional block diagram of a network monitoring apparatus 1200b relating to this embodiment is illustrated in FIG. 12. Differences with the network monitoring apparatus 1200 illustrated in FIG. 4 are points that an outbound data storage unit 1221 is introduced, and the outbound-communication extractor 1206 is replaced with an outbound-communication extractor 1206b whose operation is changed so as to use the outbound data storage unit 1221.

When the outbound-communication extractor 1206b detects the first outbound communication, the outbound-communication extractor 1206b stores data to identify the connection in the outbound data storage unit 1221, and when another outbound communication for the same connection is detected later, the outbound-communication extractor 1206b determines whether or not the duration of the connection continues a predetermined time or longer (e.g. 30 minutes or longer).

Figure 13:
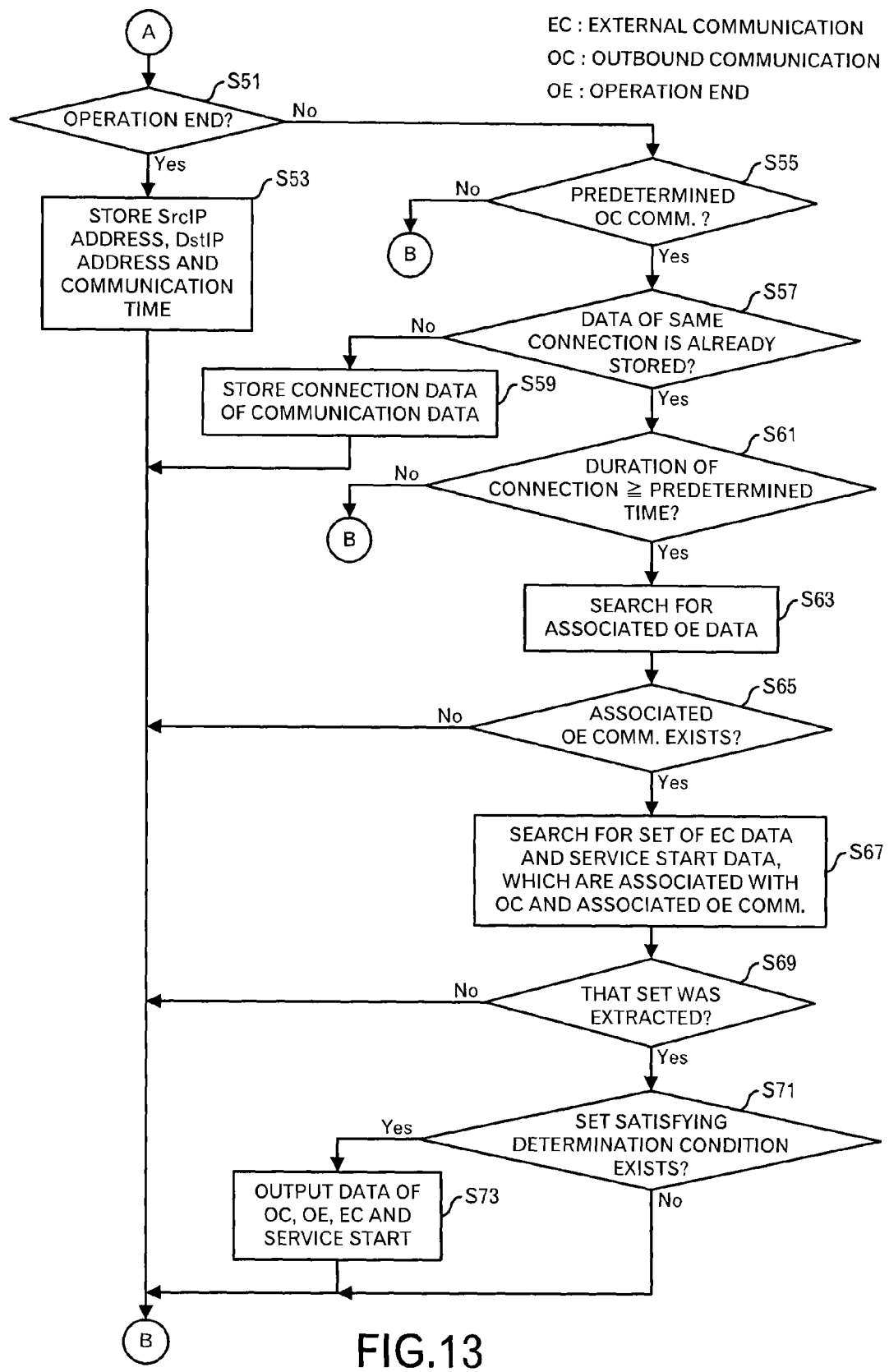
FIG. 13 is a diagram depicting a processing flow relating to the second embodiment.

Next, a processing flow relating to this embodiment will be explained by using FIGS. 13 and 14. Because processing portions illustrated in FIG. 5 are identical, the explanation is omitted.

In response to the instruction from the service-start extractor 1204, the operation-end extractor 1205 determines whether or not the communication data from the communication-data obtaining unit 1201 corresponds to the predetermined operation end (step S51). For example, it is determined whether or not an option within the DCERPC header is "Delete Service Request" in the communication in the DCE/RPC over SMB or DCR/RPC protocol.

When such a condition is satisfied, the operation-end extractor 1205 stores the operation end data including the IP address (SrcIP address) of the transmission source, the IP address (DstIP address) of the transmission destination and the communication time, which are included in the communication data, in the end data storage unit 1212 (step S53). For example, data as illustrated in FIG. 9 is stored in the end data storage unit 1212.

After that, the processing shifts to the step S13 in FIG. 5 through the terminal B. Moreover, the operation-end extractor 1205 causes the outbound-communication extractor 1206*b* to discard the communication data that was received this time.

On the other hand, when the communication data that was received this time does not correspond to the predetermined operation end, the operation-end extractor 1205 instructs the outbound-communication extractor 1206*b* to perform a processing. In response to the instruction from the operation-end extractor 1205, the outbound-communication extractor 1206*b* determines whether or not the communication data from the communication-data obtaining unit 1201 corresponds to a predetermined outbound communication (step S55).

Specifically, it is determined whether or not a condition is satisfied that the IP address (DstIP address) of the transmission destination the communication data in the communication of HTTP or HTTPS is not included in the list of IP addresses, which is stored in the IP address list storage unit 1203, in other words, the IP address (DstIP address) is an IP address of an apparatus outside of the system.

When the communication data that was received this time does not correspond to the predetermined outbound communication, the processing returns to the step S13 in FIG. 5 through the terminal B.

On the other hand, when the communication data that was received this time corresponds to the predetermined outbound communication, the outbound-communication extractor 1206*b* determines whether or not data for the same connection as the connection of the communication data that was received this time has been stored in the outbound data storage unit 1221 (step S57). For example, when the IP addresses of the transmission source are identical, the IP addresses of the transmission destination are identical, the port numbers of the transmission source in Transmission Control Protocol (TCP) are identical, and the port numbers of the transmission destination in TCP are identical, it is determined that data for the same connection exists.

When the data for the same connection as the connection of the communication data that was received this time is not stored in the outbound data storage unit 1221, the outbound-communication extractor 1206*b* stores connection data of the communication data that was received this time in the outbound data storage unit 1221 (step S59). Then, the processing shifts to the step S13 in FIG. 5 through the terminal B.

Figures 14, 15:
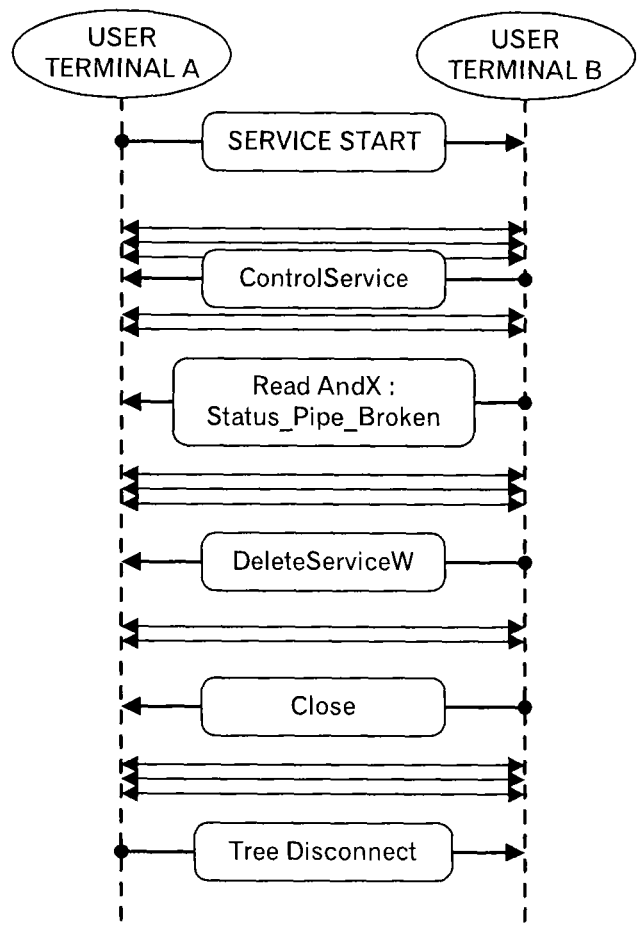
FIG. 14 is a diagram depicting an example of data stored in an outbound data storage unit.
FIG. 15 is a diagram to explain presumption of a third embodiment.

For example, data as illustrated in FIG. 14 is stored in the outbound data storage unit 1221. In an example of FIG. 14, the IP address of the transmission source, the IP address of the transmission destination, the port number of the transmission destination, the port number of the transmission source, a start time that is the communication time when the outbound communication was firstly detected, and an update time that is the communication time of the communication data of the outbound communication when the outbound communication for the same connection is detected are registered. Initially, the start time is the same as the update time.

On the other hand, when the data for the same connection as the connection of the communication data that was received this time has been stored in the outbound data storage unit 1221, the outbound-communication extractor 1206*b* registers the communication time of the communication data that was received this time as the update time for that connection data, and determines whether or not the connection duration is equal to or longer than a predetermined time (step S61). It is determined whether or not (update time−start time) is equal to or longer than 30 minutes, for example.

When the connection duration is less than the predetermined time, the processing returns to the step S13 in FIG. 5 through the terminal B.

On the other hand, when the connection duration is equal to or longer than the predetermined time, the outbound-communication extractor 1206*b* outputs the communication data that was received this time to the associated-data extractor 1207.

The associated-data extractor 1207 searches the end data storage unit 1212 for the operation end data associated with this outbound communication, and extracts the pertinent operation end data when the pertinent operation end data exists (step S63). Specifically, the operation end data including the same IP address as the IP address of the transmission source in this outbound communication as the IP address of the transmission source or the IP address of the transmission destination is extracted. The operation end data for plural times of the communication may be extracted.

When the operation end data associated with this outbound communication is not stored in the end data storage unit 1212 (step S65: No route), the processing returns to the step S13 in FIG. 5 through the terminal B.

On the other hand, when the operation end data associated with this outbound communication has been stored in the end data storage unit 1212 (step S65: Yes route), the associated-data extractor 1207 outputs the communication data that was received this time (i.e. the communication data in the outbound communication) and the associated operation end data to the determination unit 1208.

The determination unit 1208 searches the associated data storage unit 1210 for a set of the external communication data and the service start data, which are associated with the communication data that was received this time (i.e. communication data in the outbound communication) and the associated operation end data, and extracts data of that set when that set exists (step S67).

Specifically, it is determined whether or not a condition is satisfied that the service start data exists, which includes the IP address of the transmission destination and the IP address of the transmission source, which are included in the operation end data, as the IP address of the transmission destination and the IP address of the transmission source or the IP address of the transmission source and the IP address of the transmission destination. Furthermore, it is also determined whether or not a condition is satisfied that the IP address of the transmission source and the IP address of the transmission destination, which are included in the external communication data correlated with that service start data, is included in the communication data that was received this time, as the IP address of the transmission destination and the IP address of the transmission source.

Then, when no set of the external communication data and the service start data, which are associated with the communication data that was received this time (i.e. communication data in the outbound communication) and the associated operation end data, is not detected in the associated data storage unit 1210 (step S69: No route), the processing returns to the step S13 in FIG. 5 through the terminal B.

On the other hand, when the set of the external communication data and the service start data, which are associated with the communication data that was received this time (i.e. communication data in the outbound communication) and the associated operation end data, is extracted (step S69: Yes route), the determination unit 1208 determines whether or not the aforementioned set that satisfies a determination condition stored in the determination condition storage unit 1211 exists (step S71). The determination condition is the same as that in the first embodiment. In other words, a difference (T1 in FIG. 10) between the communication time of the service start data and the communication time of the external communication data is within 1000 msec, for example, a difference (T2 in FIG. 10) between the communication time of the external communication data and the communication time of the operation end data is within 10000 msec, for example, and a difference (T3 in FIG. 10) between the communication time of the operation end data and the communication time of the external connection (i.e. outbound communication. the communication time of the communication data that was received this time) is within 1000 msec, for example. The period of the intelligence activities becomes long because various processing is performed.

When the data that satisfies the determination condition is extracted, the determination unit 1208 notifies the detection of the intelligence activities by causing the output unit 1209 to transmit data of the outbound communication (i.e. communication relating to the communication data that was received this time), the operation end, the external communication and the service start to the administrator's terminal 1300 (step S73). Then, the processing returns to the step S13 in FIG. 5 through the terminal B. When the data that satisfies the determination condition is not extracted, the processing returns to the step S13 in FIG. 5 through the terminal B.

By performing such a processing, it becomes possible to detect the intelligence activities based on much probable outbound communication, and heighten the detection accuracy of the intelligence activities.

Embodiment 3

The communication corresponding to the operation end depends on commands or program executed in the intelligence activities or version of the Operating System (OS) or setting in the user terminal B that is a target. Therefore, when wrong operation end data is selected, there is possibility that the outbound communication that does not have any relation with the attack is combined or the outbound communication that is associated with the attack cannot be combined as a candidate.

In the attack, immediately after the operation end communication at the time when the operation ends, an outbound communication that is an execution result of the operation occurs. Then, after the operation end communication, a session in SMB, which is established from the user terminal A that is a springboard to the user terminal B, which is a target, ends. At this time, because the turns of occurrences of the session end communication and the outbound communication may be exchanged depending on various conditions such as the network environment, the status of the springboard, implementation of the remote-control malware and the like, the turns cannot be uniquely defined.

For example, as illustrated in FIG. 15, communications between the user terminal A, which is the springboard, and the user terminal B, which is the target, are monitored to extract predetermined operation end candidates (in case of SMB, for example, ControlService, DeleteServiceW, Close Response) after the service start. Then, for each occurrence of communications corresponding to the operation end candidates, the update is performed with the latest operation end candidate.

Figure 16:
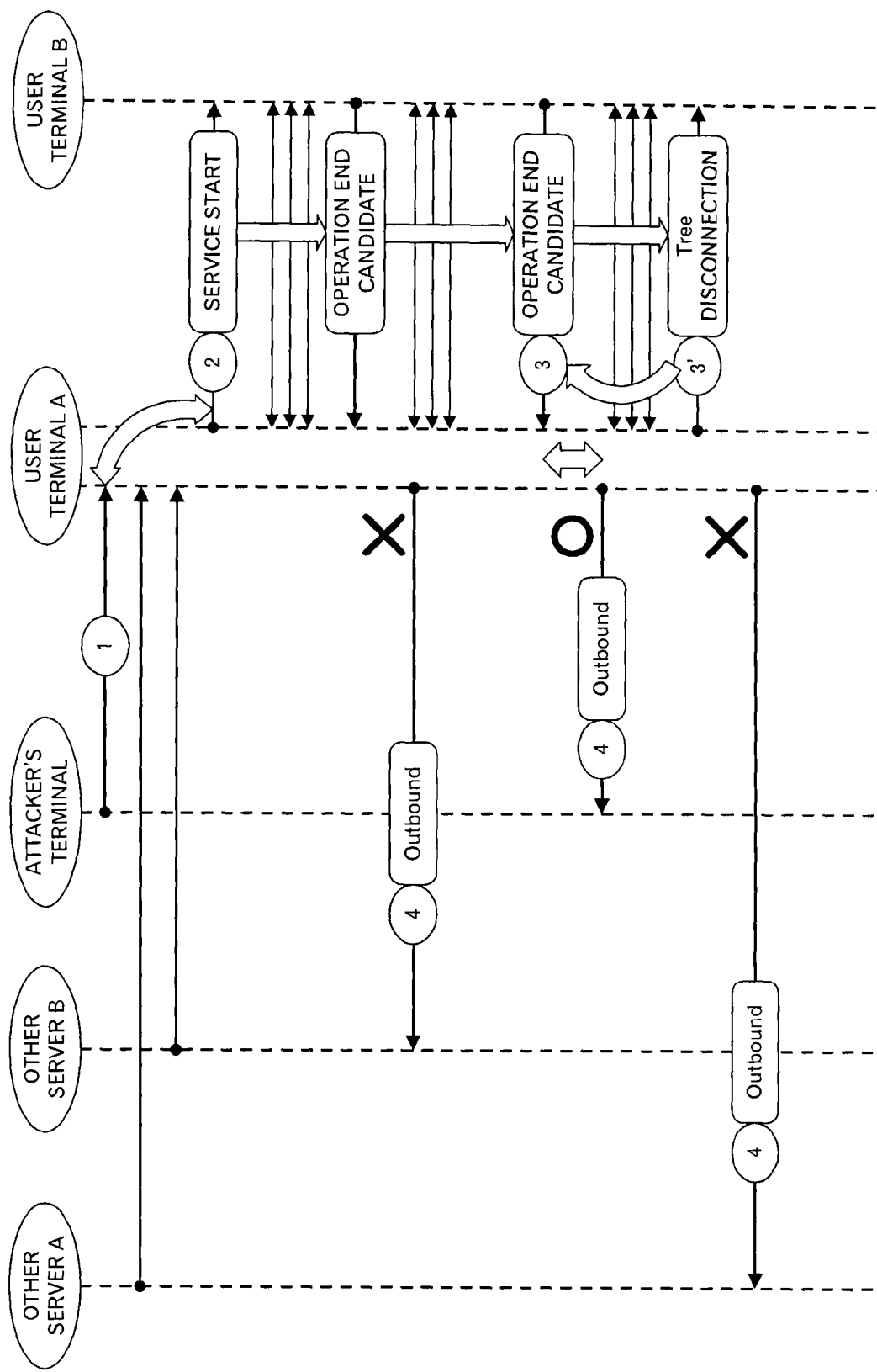
FIG. 16 is a diagram schematically depicting a viewpoint to detect an attack relating to the third embodiment.

When the entire communications are viewed, as illustrated in FIG. 16, inbound communications from the attacker's terminal 2100 and other servers A and B are recorded, and the service start is also recorded. However, in this embodiment, for each detection of the aforementioned operation end candidate, the operation end candidate is recorded. Outbound communications to the attacker's terminal 2100 and other servers A and B meanwhile are detected. However, it is not fixed which of the outbound communications is selected until the session disconnection (e.g. Tree Disconnect in SMB) is detected. When the session disconnection is detected, the latest operation end candidate is selected, and an outbound communication (4) to the attacker's terminal 2100, which occurs within a predetermined time since the latest operation end candidate, is selected. Then, the service start data and the external communication, which are associated with the latest operation end candidate and the outbound communication, are extracted.

Figure 17:
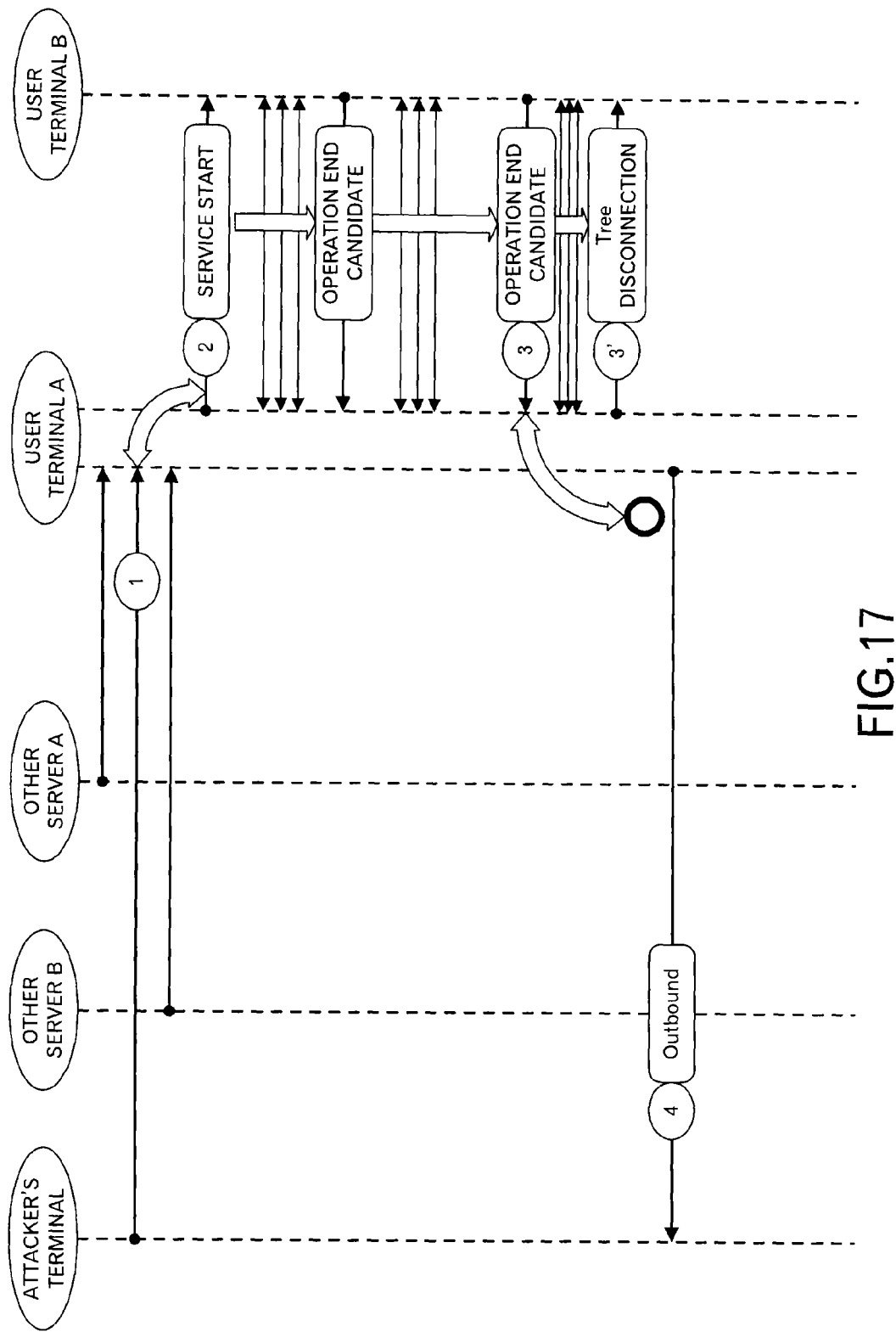
FIG. 17 is a diagram schematically depicting a viewpoint to detect an attack relating to the third embodiment.

After the occurrence of the latest operation end candidate, when no outbound communication is detected within the predetermined time, it is not determined that the attack is detected. Moreover, as schematically illustrated in FIG. 17, in case where the outbound communication does not occur and the session disconnection occurs after the oldest operation end candidate is detected, the operation end candidate is extracted by using the outbound communication after the session disconnection, and the service start and the external communication are further extracted.

Figure 18:
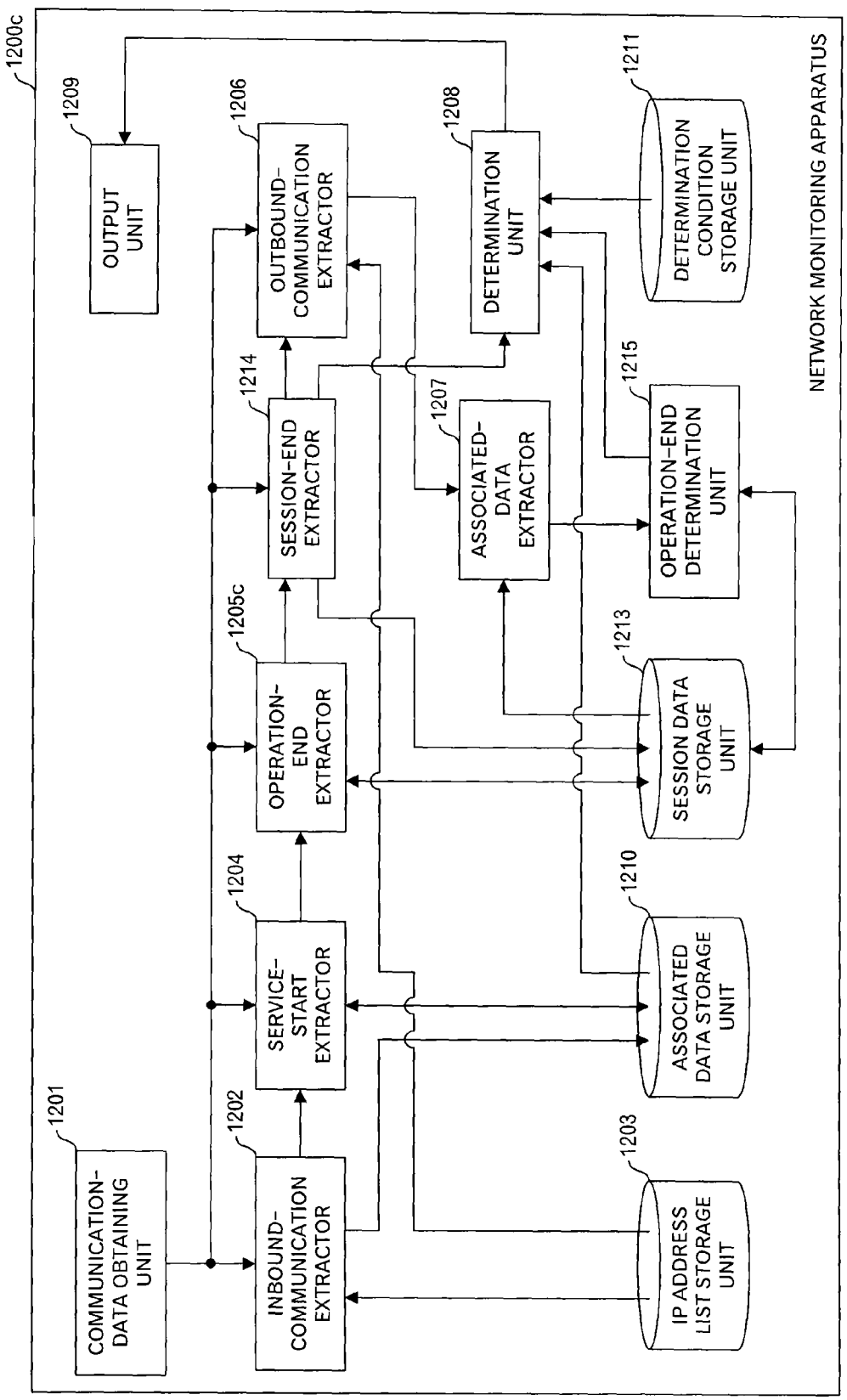
FIG. 18 is a diagram depicting a configuration example of a network monitoring apparatus relating to the third embodiment.
Figure 19:
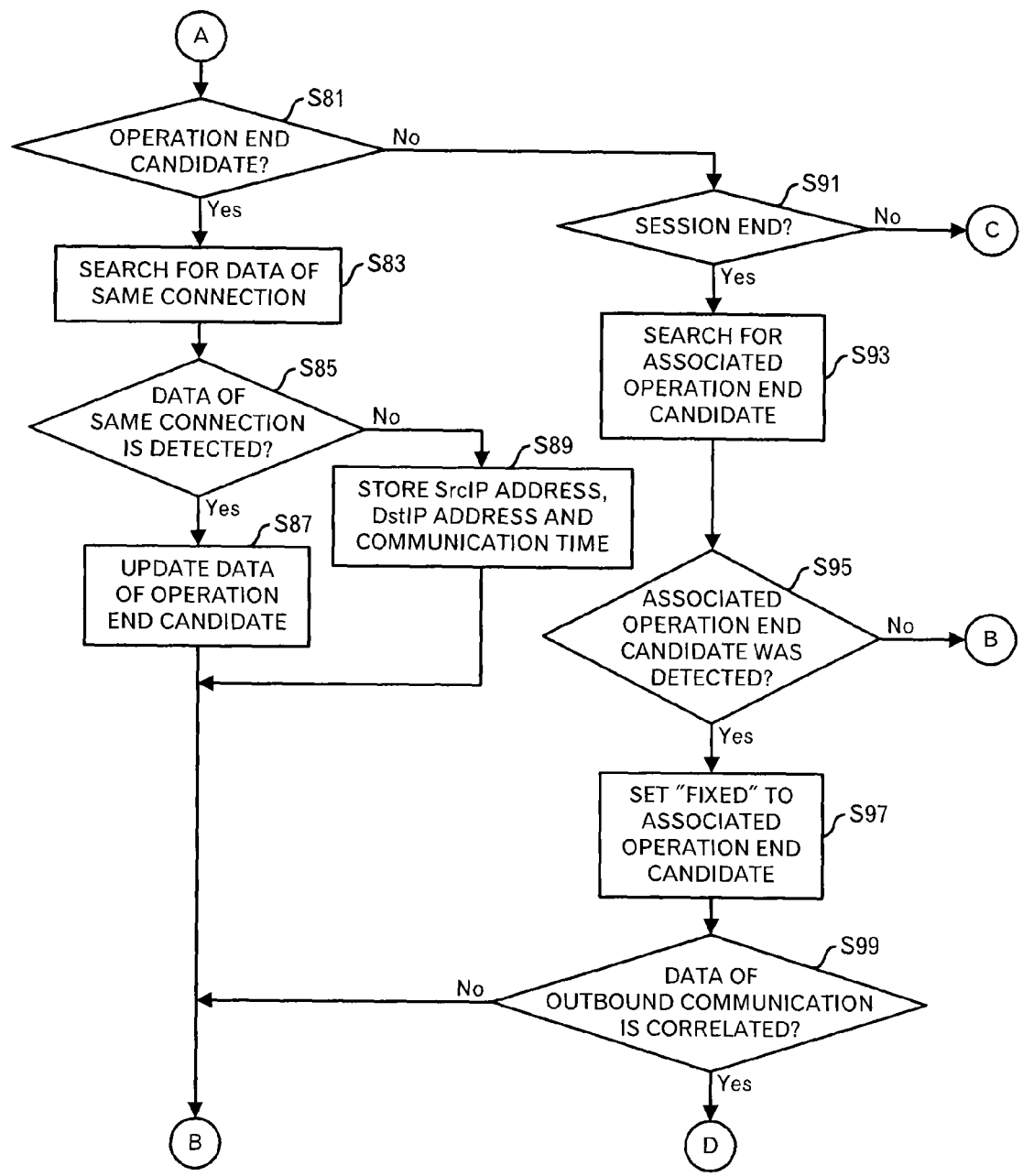
FIG. 19 is a diagram depicting a processing flow relating to the third embodiment.

Next, a network monitoring apparatus 1200c relating to this embodiment is illustrated in FIG. 18. The network monitoring apparatus 1200c relating to this embodiment is different from the network monitoring apparatus 1200 illustrated in FIG. 4 in following points. In other words, a session-end extractor 1214, a session data storage unit 1213 and an operation-end determination unit 1215 are newly introduced, and the end data storage unit 1212 is eliminated. Moreover, the processing contents of the operation-end extractor 1205c are changed.

The operation-end extractor 1205c detects the operation end candidates, stores them in the session data storage unit 1213, and when an operation end candidate for the same session is newly detected, the operation-end extractor 1205c updates the session data storage unit 1213. When the session-end extractor 1214 detects the communication data that corresponds to the session end, the session-end extractor 1214 stores data representing the session end in the session data storage unit 1213. When the outbound-communication extractor 1206 detects a predetermined outbound communication, the outbound-communication extractor 1206 instructs the associated-data extractor 1207 to perform a processing. The associated-data extractor 1207 searches the session data storage unit 1213 for the operation end data associated with the outbound communication to extract the operation end data for the latest operation end candidate.

When the operation end data is extracted by the associated-data extractor 1207, however, the data representing the session end is not stored in correlation with the extracted operation end data, the operation-end determination unit 1215 stores data of the outbound communication at this time in the session data storage unit 1213 in correlation with the operation end data. When the data representing the session end has been stored, the operation-end determination unit 1215 instructs the determination unit 1208 to perform a processing.

When the session-end extractor 1214 detects the session end in a state where the data of the outbound communication is stored in correlation with the operation end data for the operation end candidate, the session-end extractor 1214 instructs the determination unit 1208 to perform a processing.

Next, a processing flow relating to this embodiment will be explained by using FIGS. 19 to 22. The portions of the processing illustrated in FIG. 5 are identical. Therefore, the explanation is omitted.

In response to the instruction from the service-start extractor 1204, the operation-end extractor 1205*c* determines whether or not the communication data from the communication-data obtaining unit 1201 corresponds to the predetermined operation end candidate (step S81). For example, it is determined whether or not the option within the DCERPC header is ControlService, DeleteServiceW or Close in the communication of DCE/RPC over SMB or DCR/RPC protocol.

When the communication data that was received this time corresponds to the predetermined operation end candidate, the operation-end extractor 1205*c* searches the session data storage unit 1213 for data for the same connection as that of the communication data that was received this time (the combination of the IP address of the transmission source and the IP address of the transmission destination is same) (step S83).

When data for the same connection as that of the communication data that was received this time does not exist in the session data storage unit 1213 (step S85: No route), the operation-end extractor 1205*c* stores the IP address of the transmission source, the IP address of the transmission destination and the communication time in the session data storage unit 1213 (step S89). Then, the processing returns to the step S13 of FIG. 5 through the terminal B.

For example, data as illustrated in FIG. 20 is stored in the session data storage unit 1213. In an example of FIG. 20, data of the outbound communication, which relates to the operation end data, is stored. The operation end data includes the IP address of the transmission source, the IP address of the transmission destination, the communication time and a fixing flag representing whether or not this is the session end (fixed or candidate). In addition, the data of the outbound communication includes the IP address of the transmission source, the IP address of the transmission destination and the communication time.

On the other hand, when data for the same connection as that of the communication data that was received this time exists in the session data storage unit 1213 (step S85: Yes route), the operation-end extractor 1205*c* updates the operation end data for the same connection with the communication data that was received this time (step S87).

After the step S87 or S89, the operation-end extractor 1205*c* causes the session-end extractor 1214 and the outbound-communication extractor 1206 to discard the communication data that was received this time.

Moreover, when the communication data that was received this time does not correspond to the predetermined operation end candidate, the operation-end extractor 1205*c* instructs the session-end extractor 1214 to perform a processing.

When an instruction from the operation-end extractor 1205*c* is received, the session-end extractor 1214 determines whether or not the communication data that was received this time corresponds to a predetermined session end (step S91). As described above, it is determined whether or not the communication data corresponds to Tree Disconnect in SMB, for example.

When the communication data that was received this time does not correspond to the predetermined session end, the session-end extractor 1214 instructs the outbound-communication extractor 1206 to perform a processing. The processing shifts to a processing in FIG. 21 through terminal C.

On the other hand, when the communication data that was received this time corresponds to the predetermined session end, the session-end extractor 1214 searches the session data storage unit 1213 for the is operation end data of the associated operation end candidate (step S93). More specifically, the session-end extractor 1214 searches for the operation end data including a set of the IP address of the transmission source and the IP address of the transmission destination, which are included in the communication data that was received this time (the IP address of the transmission source and the IP address of the transmission destination is exchangeable). The session-end extractor 1214 causes the outbound-communication extractor 1206 to discard the communication data.

When the associated operation end candidate is not extracted (step S95: No route), the processing returns to the step S13 in FIG. 5 through the terminal B.

On the other hand, when the associated operation end candidate is extracted (step S95: Yes route), the session-end extractor 1214 sets "fixed" to the fixing flag of the associated operation end candidate (step S97). Furthermore, the session-end extractor 1214 determines whether or not the data of the outbound communication is correlated with the fixed operation end candidate in the session data storage unit 1213 (step S99). In case that is explained by using FIG. 16, when the session end (Tree disconnection) is detected, the data of the outbound communication has already been correlated with the operation end data in the session data storage unit 1213.

Therefore, when the data of the outbound communication is correlated with the fixed operation end candidate, the session-end extractor 1214 instructs the determination unit 1208 to perform a processing. The processing shifts to a processing in FIG. 21 through terminal D.

On the other hand, when the data of the outbound communication is not correlated with the fixed operation end candidate, the processing returns to the step S13 in FIG. 5 through the terminal B.

Figure 21:
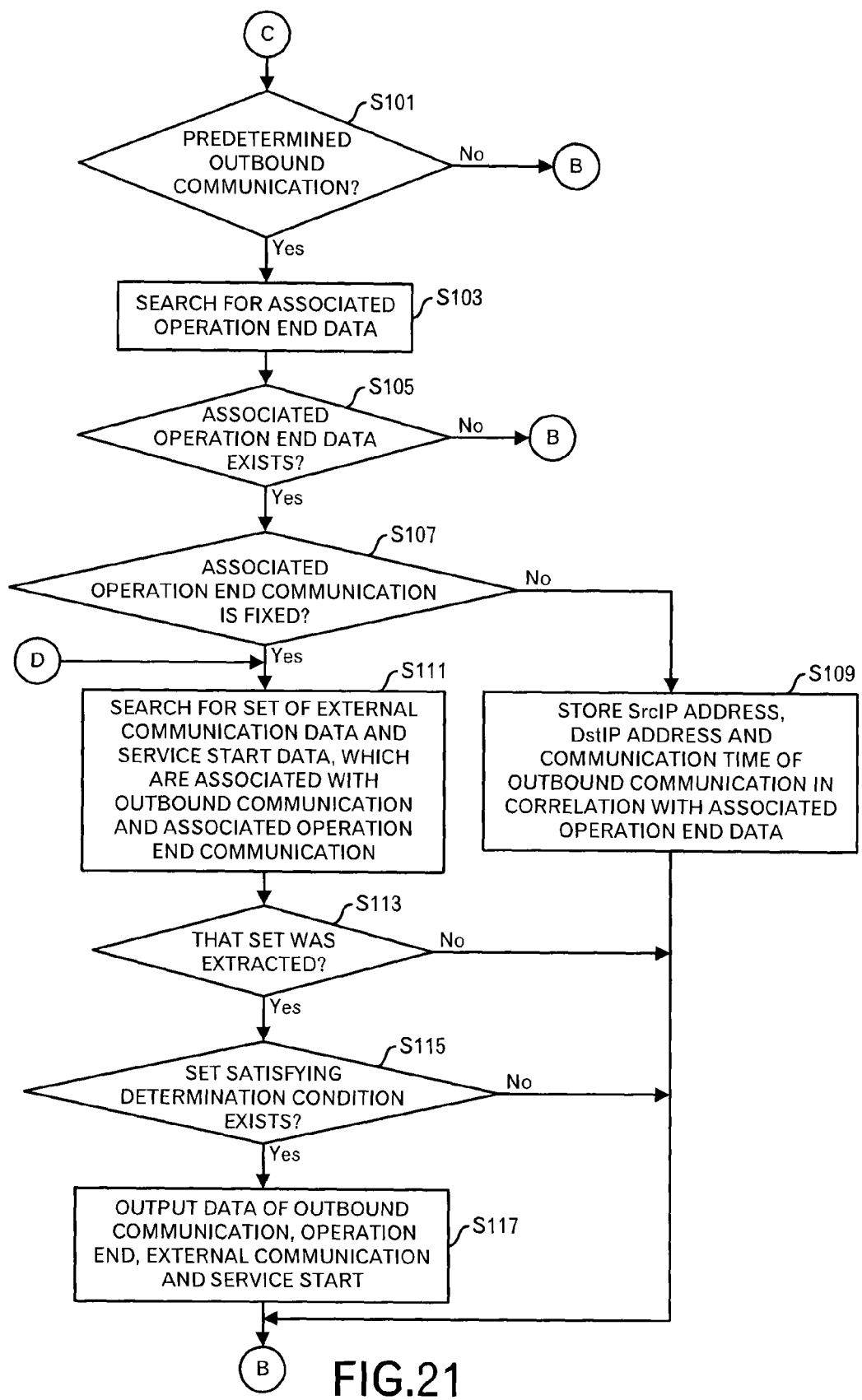
FIG. 21 is a diagram depicting a processing flow relating to the third embodiment.

Shifting to the explanation of the processing in FIG. 21, in response to the instruction from the session-end extractor 1214, the outbound-communication extractor 1206 determines whether or not the communication data from the communication-data obtaining unit 1201 corresponds to a predetermined outbound communication (step S101).

Specifically, it is determined whether or not a condition is satisfied, that the communication data corresponds to the communication in HTTP or HTTPS and the IP address (DstIP address) of the transmission destination of the communication data is not included in the list of IP addresses, which is stored in the IP address list storage unit 1203, in other words, the DstIP address is an IP address of any apparatus outside the system.

When the communication data that was received this time does not correspond to the predetermined outbound communication, the processing returns to the step S13 in FIG. 5 through the terminal B.

On the other hand, when the communication data that was received this time corresponds to the predetermined outbound communication, the outbound-communication extractor 1206 outputs the communication data that was received this time to the associated-data extractor 1207.

The associated-data extractor 1207 searches the session data storage unit 1213 for the operation end data associated with this outbound communication to extract the pertinent operation end data when the pertinent operation end data exists (step S103). More specifically, the associated-data extractor 1207 searches for the operation end data including the same IP address as the IP address of the transmission source in this outbound communication as the IP address of the transmission source or the IP address of the transmission destination. The operation end data for plural times of the communication may be extracted.

When the operation end data associated with this outbound communication is not stored in the session data storage unit 1213 (step S105: No route), the processing returns to the step S13 in FIG. 5 through the terminal B.

On the other hand, when the operation end data associated with this outbound communication is stored in the session data storage unit 1213 (step S105: Yes route), the associated-data extractor 1207 outputs the communication data that was received this time (i.e. communication data of the outbound communication) and the associated operation end data to the operation-end determination unit 1215.

The operation-end determination unit 1215 determines whether or not "fixed" is set to the fixing flag of the associated operation end data (step S107). In case that was explained by using FIG. 16, before "fixed" is set to the fixing flag, the outbound communication is detected. In other words, when "fixed" is not set to the fixing flag of the associated operation end data, the operation-end determination unit 1215 stores the IP address of the transmission source, the IP address of the transmission destination and the communication time of the outbound communication in the session data storage unit 1213 in correlation with the associated operation end data (step S109). Data of the outbound communications for plural times may be stored in correlation with the same operation end data. Then, the processing returns to the step S13 in FIG. 5 through the terminal B.

As illustrated in FIG. 22, when the outbound communication associated with the operation end data in the third line is detected, the IP address of the transmission source, the IP address of the transmission destination and the communication time is stored in correlation with the data of the outbound communication. After transition to such a state, the processing shifts to the step S99. Then, the processing shifts to step S111 through the terminal D.

On the other hand, when "fixed" has been set to the fixing flag of the associated operation end data, as illustrated in the first line of FIG. 22, the outbound communication associated with the operation end data is not detected hereinbefore. Then, in such a case, the operation-end determination unit 1215 outputs the communication data that was received this time (i.e. data of the outbound communication) and the associated operation end data to the determination unit 1208.

The determination unit 1208 searches the associated data storage unit 1210 for a set of the external communication data and the service start data, which are associated with the communication data that was received this time or the communication data of the associated outbound communication and the associated operation end data to extract data of the pertinent set when the pertinent set exists (step S111).

More specifically, it is determined whether or not a condition is satisfied that the service start data exists that includes the IP address of the transmission destination and the IP address of the transmission source, which are included in the operation end data, as the IP address of the transmission destination and the IP address of the transmission source or the IP address of the transmission source and the IP address of the transmission destination. Furthermore, it is determined whether or not a condition is satisfied that the communication data of the outbound communication includes the IP address of the transmission source and the IP address of the transmission destination, which are included in the external communication data that is correlated with that service start data, as the IP address of the transmission destination and the IP address of the transmission source.

Then, when the set of the external communication data and the service start data, which are associated with the communication data of the outbound communication and the associated operation end data, is not detected in the associated data storage unit 1210 (step S113: No route), the processing returns to the step S13 in FIG. 5 through the terminal B.

On the other hand, when the set of the external communication data and the service start data, which are associated with the communication data of the outbound communication and the associated operation end data, is extracted (step S113: Yes route), the determination unit 1208 determines whether or not the aforementioned set that satisfies the determination condition stored in the determination condition storage unit 1211 exists (step S115).

The determination condition includes a condition that a difference (T1 in FIG. 10) between the communication time of the service start data and the communication time of the external communication data is within 1000 msec, for example, a difference (T2 in FIG. 10) between the communication time of the external communication data and the communication time of the operation end data is within 10000 msec, for example, and a difference (T3 in FIG. 10) between the communication time of the operation end data and the communication time of the external connection (i.e. outbound communication. The communication time of the communication data that was received this time) is within 1000 msec, for example. Typically, the period for the intelligence activities becomes long, because various processing is performed.

When data that satisfies the determination condition is extracted, the determination unit 1208 notifies the detection of the intelligence activities by causing the output unit 1209 to transmit data of the outbound communication (i.e. communication relating to the communication data that was received this time), the operation end, the external communication and the service start to the administrator's terminal 1300, for example (step S117). Then, the processing returns to the step S13 in FIG. 5 through the terminal B. When data that satisfies the determination condition is not extracted, the processing returns to the step S13 in FIG. 5 through the terminal B.

By performing the aforementioned processing, the intelligence activities can be detected with reality.

Embodiment 4

In the third embodiment, the operation end candidate is defined by a specific SMB command or a specific option of DCERPC. However, when the command or program erroneously ends, the outbound communication occurs and the session of SMB ends after the communications of the SMB commands that frequently occur during the operation or before or after the operation.

In this embodiment, even in case of the SMB commands that frequently occur during the operation or before or after the operation, the status of the SMB communication is monitored to include the SMB communication in the operation end candidates in case where the status represents error. Accordingly, it is possible to lower, by selecting an appropriate operation end, the possibility that the candidate of the outbound communication that has no relation with the attack is combined or the outbound communication that relates to the attack cannot be combined as the candidate.

Figure 23:
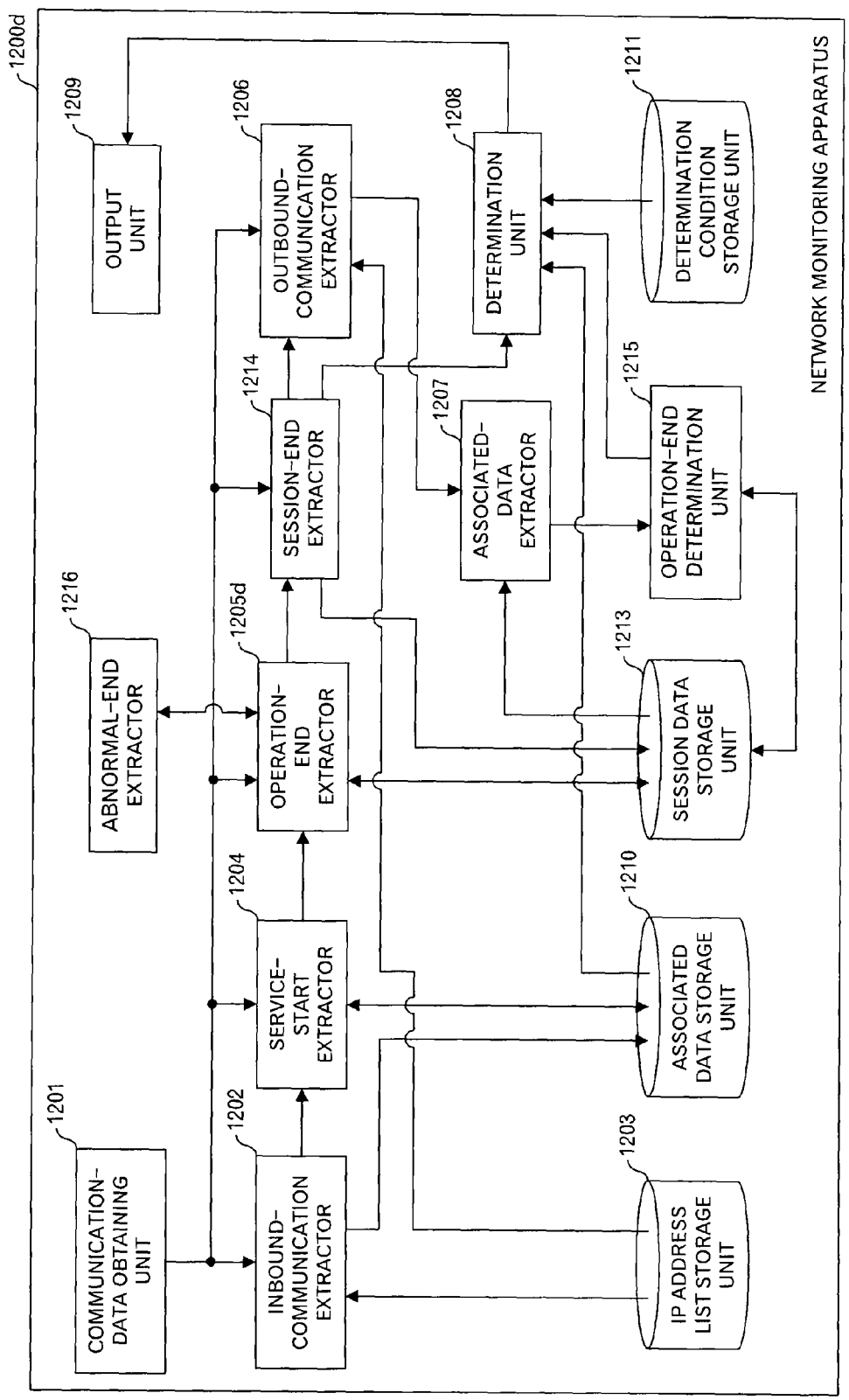
FIG. 23 is a diagram depicting a configuration example of a network monitoring apparatus relating to a fourth embodiment.

A network monitoring apparatus 1200d for performing such a processing is illustrated in FIG. 23. Differences with the network monitoring apparatus 1200c illustrated in FIG. 18 include a point that an abnormal-end extractor 1216 is newly added and a point that an operation-end extractor 1205d is used. The abnormal-end extractor 1216 determines whether or not an execution status of the SMB command represents an error in the communication in the SMB protocol. An interface with the abnormal-end extractor 1216 is added to the operation-end extractor 1205d.

Figure 24:
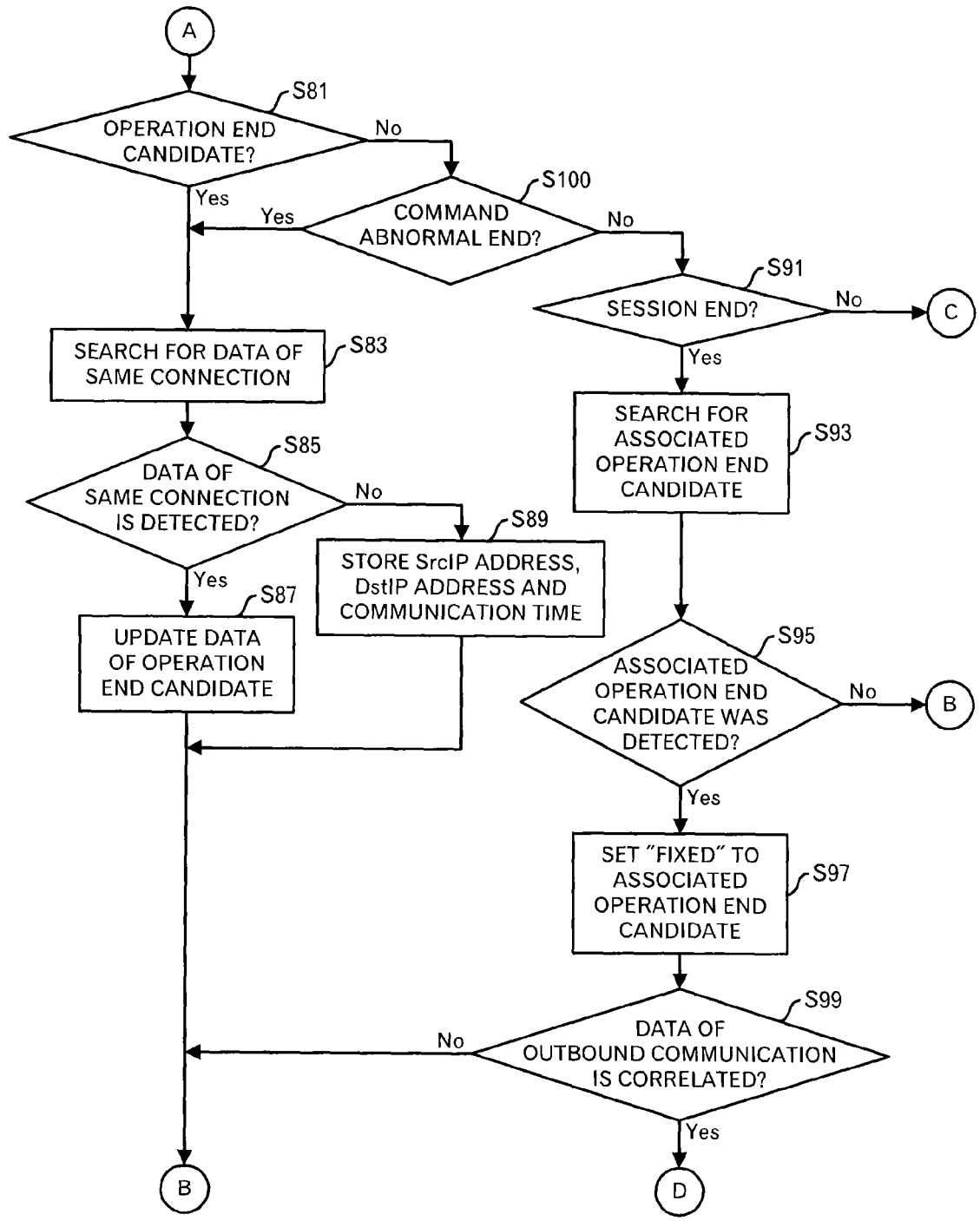
FIG. 24 is a diagram depicting a processing flow relating to the fourth embodiment.

Next, a processing flow of the network monitoring apparatus 1200d relating to this embodiment is illustrated in FIG. 24. Basically, this processing flow is similar to the processing flow in FIG. 19 relating to the third embodiment. However, when the operation-end extractor 1205d determines that the communication data that was received this time does not correspond to the predetermined operation end candidate, the operation-end extractor 1205d outputs the communication data that was received this time and instructs the abnormal-end extractor 1216 to perform a processing. The abnormal-end extractor 1216 determines whether or not the communication data that was received this time corresponds to a command abnormal end (step S100). As described above, it is determined whether or not the execution status of the SMB command in the communication in the SMB protocol represents an error. The abnormal-end extractor 1216 outputs this determination result to the operation-end extractor 1205d.

When the communication data that was received this time corresponds to the command abnormal end, the processing shifts to the step S83. On the other hand, when the communication data that was received this time does not correspond to the command abnormal end, the processing shifts to the step S91.

The other portion is the same as those in the third embodiment. Therefore, further explanation is omitted.

When the condition of the command abnormal end is included in the condition for the operation end candidates, the same processing result can be obtained.

Although the embodiments of this invention were explained, this invention is not limited to those embodiments. For example, as for the processing flows, as long as the processing results do not change, the turns of the steps may be exchanged or plural steps may be executed in parallel.

Moreover, the functional block configurations of the network monitoring apparatus 1200, 1200b, 1200c and 1200d may not correspond to a program module configuration. The configuration of the data storage units may not correspond to a file configuration.

Furthermore, the network monitoring apparatus 1200 or the like may be implemented by plural computers instead of one computer. Moreover, the user terminal B may be an apparatus outside the system including the user terminal A.

Figure 25:
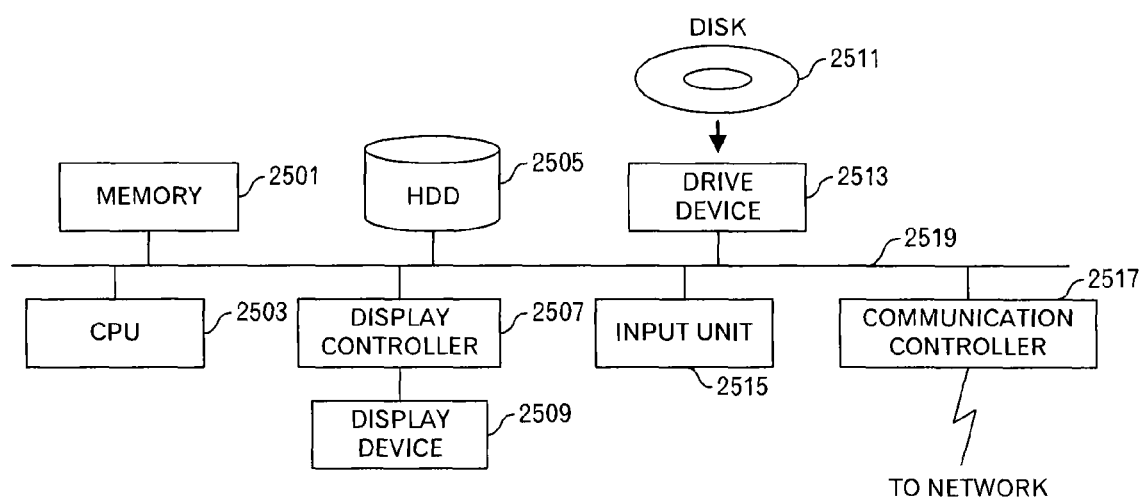
FIG. 25 is a functional block diagram of a computer.

In addition, the aforementioned network monitoring apparatus 1200 or the like are computer devices as illustrated in FIG. 25. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 25. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are outlined as follows:

A network monitoring apparatus relating to the embodiments includes (A) an obtaining unit configured to obtain communication data; (B) an external communication identifying unit configured to perform a processing including, upon detecting that the obtained communication data satisfies a first condition including a condition that a communication relating to the obtain communication data is a communication from an outside of a predefined range in a network, storing external communication data including an address of a transmission source and an address of a transmission destination of the obtained communication data in a data storage unit; (C) a service start extraction unit configured to perform a processing including: upon detecting that the obtained communication data satisfies a second condition including a condition that the obtained communication data corresponds to a communication within the predefined range or a communication from an inside of the predefined range to the outside of the predefined range and corresponds to a predetermined service start, first extracting external communication data that includes, as an address of a transmission destination, the address of the transmission source of the obtained communication data from the data storage unit, and storing service start data that includes the address of the transmission destination of the obtained communication data in the data storage unit in correlation with the extracted external communication data; (D) an operation end extraction unit configured to perform a processing including: upon detecting that the obtained communication data satisfies a third condition including a condition that the obtained communication data corresponds to a communication within the predefined range or a communication from the outside of the predefined range to the inside of the predefined range and corresponds to a predetermined operation end, storing operation end data that includes the address of the transmission source and the address of the transmission destination of the obtained communication data in the data storage unit; (E) an associated data extraction unit configured to perform a processing including: upon detecting that the obtained communication data corresponds to a communication to the outside of the predefined range, second extracting certain operation end data that includes the address of the transmission source of the obtained communication data from the data storage unit; and (F) a determination unit configured to determine whether a fourth condition is satisfied, wherein the fourth condition comprises a condition that certain external communication data that includes the address of the transmission destination and the address of the transmission source, which are included in the obtained communication data, as the address of the transmission source and the address of the transmission destination, is stored in the data storage unit in correlation with certain service start data that includes the address of the transmission source or the address of the transmission destination of the certain operation end data.

By performing the aforementioned processing, it is possible to detect a case where the intelligence activities are performed from an apparatus of the springboard to a target apparatus.

The aforementioned fourth condition may include: (f1) a condition that a difference between a communication time of communication data relating to the certain service start data and a communication time of communication data relating to the certain external communication data is equal to or less than a first threshold, (f2) a condition that a difference between a communication time of communication data relating to the certain operation end data and the communication time of the communication data relating to the certain service start data is equal to or less than a second threshold, and (f3) a condition that a difference between a communication time of the obtained communication data and the communication time of the communication data relating to the certain operation end data is equal to or less than a third threshold. By employing the aforementioned temporal conditions, it becomes possible to detect the attack with high accuracy.

Furthermore, (e1) the aforementioned associated data extraction unit may operate upon determining that a period since a communication time of communication data obtained when the same session as a session of the obtained communication data is firstly detected is equal to or longer than a predetermined period. By further confirming the aforementioned temporal condition, it becomes possible to extract realistic attacks.

Moreover, (d1) the aforementioned operation end extraction unit may perform a processing including: upon detecting that the obtained communication data is communication data that satisfies the third condition for the same session as a session relating to operation end data that is previously stored in the data storage unit, updating the operation end data that is previously stored in the data storage unit based on the obtained communication data. In such a case, the network monitoring apparatus may further include: (G) a session end extraction unit configured to perform a processing including: upon detecting that the obtained communication data satisfies a fifth condition including a condition that the obtained communication data corresponds to the communication within the predefined range or a communication between the inside of the predefined range and the outside of the predefined range and corresponds to a predetermined session end, extracting operation end data for the same session as a session of the obtained communication data, and storing data that represents a session end in the data storage unit in correlation with the extracted operation end data. Then, (e2) the associated data extraction unit may further include a processing including: upon detecting that the certain operation end data is not associated with the data that represents the session end, storing second external communication data that includes the address of the transmission source and the address of the transmission destination, which are included in the obtained communication data, in the data storage unit in correlation with the certain operation end data. Moreover, (g1) the session end extraction unit may activate the determination unit upon further detecting that the second external communication data is stored in correlation with the extracted operation end data.

By performing the aforementioned processing, it becomes possible to appropriately detect a case where the operation end occurs before the session end.

Moreover, the aforementioned associated data extraction unit may activate the determination unit upon detecting that the certain operation end data is associated with the data that represents the session end. Accordingly, it becomes possible to appropriately handle a case where the communication to the outside after the session end.

Furthermore, the aforementioned third condition may include a condition that the obtained communication data represents a predefined command abnormal end. This is because there is a case where the operation ends because of the command abnormal end.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A network monitoring apparatus, comprising:
   a memory; and
   a processor configured to use the memory and execute a process, the process comprising:
      obtaining communication data;
      upon detecting that the obtained communication data satisfies a first condition including a condition that a communication relating to the obtained communication data is a communication from an outside of a predefined range in a network, storing external communication data including an address of a transmission source and an address of a transmission destination of the obtained communication data in a data storage unit;
      upon detecting that the obtained communication data satisfies a second condition including a condition that the obtained communication data corresponds to a communication within the predefined range or a communication from an inside of the predefined range to the outside of the predefined range and corresponds to a predetermined service start, first extracting external communication data whose transmission destination corresponds to the address of the transmission source of the obtained communication data from the data storage unit, and storing service start data that includes the address of the transmission destination of the obtained communication data in the data storage unit in correlation with the extracted external communication data;

upon detecting that the obtained communication data satisfies a third condition including a condition that the obtained communication data corresponds to the communication within the predefined range or a communication from the outside of the predefined range to the inside of the predefined range and corresponds to a predetermined operation end, storing operation end data that includes the address of the transmission source and the address of the transmission destination of the obtained communication data in the data storage unit;

upon detecting that the obtained communication data corresponds to a communication to the outside of the predefined range, second extracting certain operation end data that includes the address of the transmission source of the obtained communication data from the data storage unit; and determining whether a fourth condition is satisfied, wherein the fourth condition comprises a condition that certain external communication data whose transmission source and transmission destination correspond to the address of the transmission destination and the address of the transmission source, which are included in the obtained communication data, is stored in the data storage unit in correlation with certain service start data that includes the address of the transmission source or the address of the transmission destination of the certain operation end data.

2. The network monitoring apparatus as set forth in claim 1, wherein the fourth condition further includes:

a condition that a difference between a communication time of communication data relating to the certain service start data and a communication time of communication data relating to the certain external communication data is equal to or less than a first threshold, a condition that a difference between a communication time of communication data relating to the certain operation end data and the communication time of the communication data relating to the certain service start data is equal to or less than a second threshold, and a condition that a difference between a communication time of the obtained communication data and the communication time of the communication data relating to the certain operation end data is equal to or less than a third threshold.

3. The network monitoring apparatus as set forth in claim 1, wherein the second extracting is executed upon determining that a period since a communication time of communication data obtained when the same session as a session of the obtained communication data is firstly detected is equal to or longer than a predetermined period.

4. The network monitoring apparatus as set forth in claim 1, wherein the process further comprises:

upon detecting that the obtained communication data is communication data that satisfies the third condition for the same session as a session relating to operation end data that is previously stored in the data storage unit, updating the operation end data that is previously stored in the data storage unit based on the obtained communication data;

upon detecting that the obtained communication data satisfies a fifth condition including a condition that the obtained communication data corresponds to the communication within the predefined range or a communication between the inside of the predefined range and the outside of the predefined range and corresponds to a predetermined session end, extracting operation end data for the same session as a session of the obtained communication data, and storing data that represents a session end in the data storage unit in correlation with the extracted operation end data; and upon detecting that the certain operation end data is not associated with the data that represents the session end, storing second external communication data that includes the address of the transmission source and the address of the transmission destination, which are included in the obtained communication data, in the data storage unit in correlation with the certain operation end data, and the determining is executed upon further detecting that the second external communication data is stored in correlation with the extracted operation end data.

5. The network monitoring apparatus as set forth in claim 4, wherein the determining is executed upon detecting that the certain operation end data is associated with the data that represents the session end.

6. The network monitoring apparatus as set forth in claim 4, wherein the third condition includes a condition that the obtained communication data represents a predefined command abnormal end.

7. A non-transitory computer-readable storage medium storing a program for causing a computer to execute a process, the process comprising:

obtaining communication data;

upon detecting that the obtained communication data satisfies a first condition including a condition that a communication relating to the obtained communication data is a communication from an outside of a predefined range in a network, storing external communication data including an address of a transmission source and an address of a transmission destination of the obtained communication data in a data storage unit;

upon detecting that the obtained communication data satisfies a second condition including a condition that the obtained communication data corresponds to a communication within the predefined range or a communication from an inside of the predefined range to the outside of the predefined range and corresponds to a predetermined service start, first extracting external communication data whose transmission destination corresponds to the address of the transmission source of the obtained communication data from the data storage unit, and storing service start data that includes the address of the transmission destination of the obtained communication data in the data storage unit in correlation with the extracted external communication data;

upon detecting that the obtained communication data satisfies a third condition including a condition that the obtained communication data corresponds to the communication within the predefined range or a communication from the outside of the predefined range to the inside of the predefined range and corresponds to a predetermined operation end, storing operation end data that includes the address of the transmission source and the address of the transmission destination of the obtained communication data in the data storage unit;

upon detecting that the obtained communication data corresponds to a communication to the outside of the predefined range, second extracting certain operation end data that includes the address of the transmission source of the obtained communication data from the data storage unit; and determining whether a fourth condition is satisfied, wherein the fourth condition comprises a condition that certain external communication data whose transmission source and transmission destination correspond to the address of the transmission destination and the address of the transmission source, which are included in the obtained communication data, is stored in the data storage unit in correlation with certain service start data that includes the address of the transmission source or the address of the transmission destination of the certain operation end data.

8. A network monitoring method, comprising:

obtaining communication data:

upon detecting that the obtained communication data satisfies a first condition including a condition that a communication relating to the obtained communication data is a communication from an outside of a predefined range in a network, storing external communication data including an address of a transmission source and an address of a transmission destination of the obtained communication data in a data storage unit;

upon detecting that the obtained communication data satisfies a second condition including a condition that the obtained communication data corresponds to a communication within the predefined range or a communication from an inside of the predefined range to the outside of the predefined range and corresponds to a predetermined service start, first extracting external communication data whose transmission destination corresponds to the address of the transmission source of the obtained communication data from the data storage unit, and storing service start data that includes the address of the transmission destination of the obtained communication data in the data storage unit in correlation with the extracted external communication data;

upon detecting that the obtained communication data satisfies a third condition including a condition that the obtained communication data corresponds to the communication within the predefined range or a communication from the outside of the predefined range to the inside of the predefined range and corresponds to a predetermined operation end, storing operation end data that includes the address of the transmission source and the address of the transmission destination of the obtained communication data in the data storage unit;

upon detecting that the obtained communication data corresponds to a communication to the outside of the predefined range, second extracting certain operation end data that includes the address of the transmission source of the obtained communication data from the data storage unit; and determining whether a fourth condition is satisfied, wherein the fourth condition comprises a condition that certain external communication data whose transmission source and transmission destination correspond to the address of the transmission destination and the address of the transmission source, which are included in the obtained communication data, is stored in the data storage unit in correlation with certain service start data that includes the address of the transmission source or the address of the transmission destination of the certain operation end data.

* * * * *